(12) United States Patent
Kanno

(10) Patent No.: US 12,379,874 B2
(45) Date of Patent: *Aug. 5, 2025

(54) MEMORY SYSTEM AND METHOD OF CONTROLLING NONVOLATILE MEMORY BY CONTROLLING THE WRITING OF DATA TO AND READING OF DATA FROM A PLURALITY OF BLOCKS IN THE NONVOLATILE MEMORY

(71) Applicant: KIOXIA CORPORATION, Tokyo (JP)

(72) Inventor: Shinichi Kanno, Ota (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,898

(22) Filed: Aug. 2, 2023

(65) Prior Publication Data

US 2023/0376250 A1    Nov. 23, 2023

Related U.S. Application Data

(63) Continuation of application No. 17/444,856, filed on Aug. 11, 2021, now Pat. No. 11,762,591, which is a
(Continued)

(30) Foreign Application Priority Data

Aug. 28, 2019 (JP) .................................. 2019-155833

(51) Int. Cl.
G06F 3/06 (2006.01)

(52) U.S. Cl.
CPC .......... *G06F 3/0659* (2013.01); *G06F 3/0604* (2013.01); *G06F 3/064* (2013.01); *G06F 3/0656* (2013.01); *G06F 3/0679* (2013.01)

(58) Field of Classification Search
CPC ...... G06F 3/0604; G06F 3/064; G06F 3/0656; G06F 3/0679; G06F 3/0659
(Continued)

(56) References Cited

U.S. PATENT DOCUMENTS

2003/0081341 A1    5/2003  Wilson
2013/0326116 A1*  12/2013  Goss ................... G06F 12/0871
                                                              711/144
(Continued)

*Primary Examiner* — Gautam Sain
(74) *Attorney, Agent, or Firm* — Oblon, McClelland, Maier & Neustadt, L.L.P.

(57) ABSTRACT

A memory system includes a nonvolatile memory including a plurality of blocks and a controller configured to write data to a plurality of write destination blocks allocated from the plurality of blocks. The controller is configured to in response to receiving a read command from a host, increment a first counter value corresponding to a first block having a block address allocated to a logical address of read target data specified by the received read command. The controller is configured to read the read target data from the first block or a buffer depending on whether the read target data is readable from the first block, and decrement the first counter value corresponding to the first block. The controller is configured to prohibit processing for transitioning a state of a block associated with an uncompleted read command to a state reusable as a new write destination block.

14 Claims, 22 Drawing Sheets

Related U.S. Application Data continuation of application No. 16/815,970, filed on Mar. 11, 2020, now Pat. No. 11,119,701.

(58) Field of Classification Search
USPC .......................................................... 711/103
See application file for complete search history.

(56) References Cited

U.S. PATENT DOCUMENTS

| | | |
|---|---|---|
| 2017/0017571 A1 | 1/2017 | Choi et al. |
| 2017/0068456 A1* | 3/2017 | Toge ..................... G06F 3/0679 |
| 2017/0351614 A1 | 12/2017 | Camp et al. |
| 2018/0341407 A1 | 11/2018 | Kanno |
| 2018/0373450 A1 | 12/2018 | Ji |
| 2019/0212943 A1 | 7/2019 | Choi |
| 2019/0347034 A1 | 11/2019 | Hasbun et al. |
| 2020/0089430 A1 | 3/2020 | Kanno |

* cited by examiner

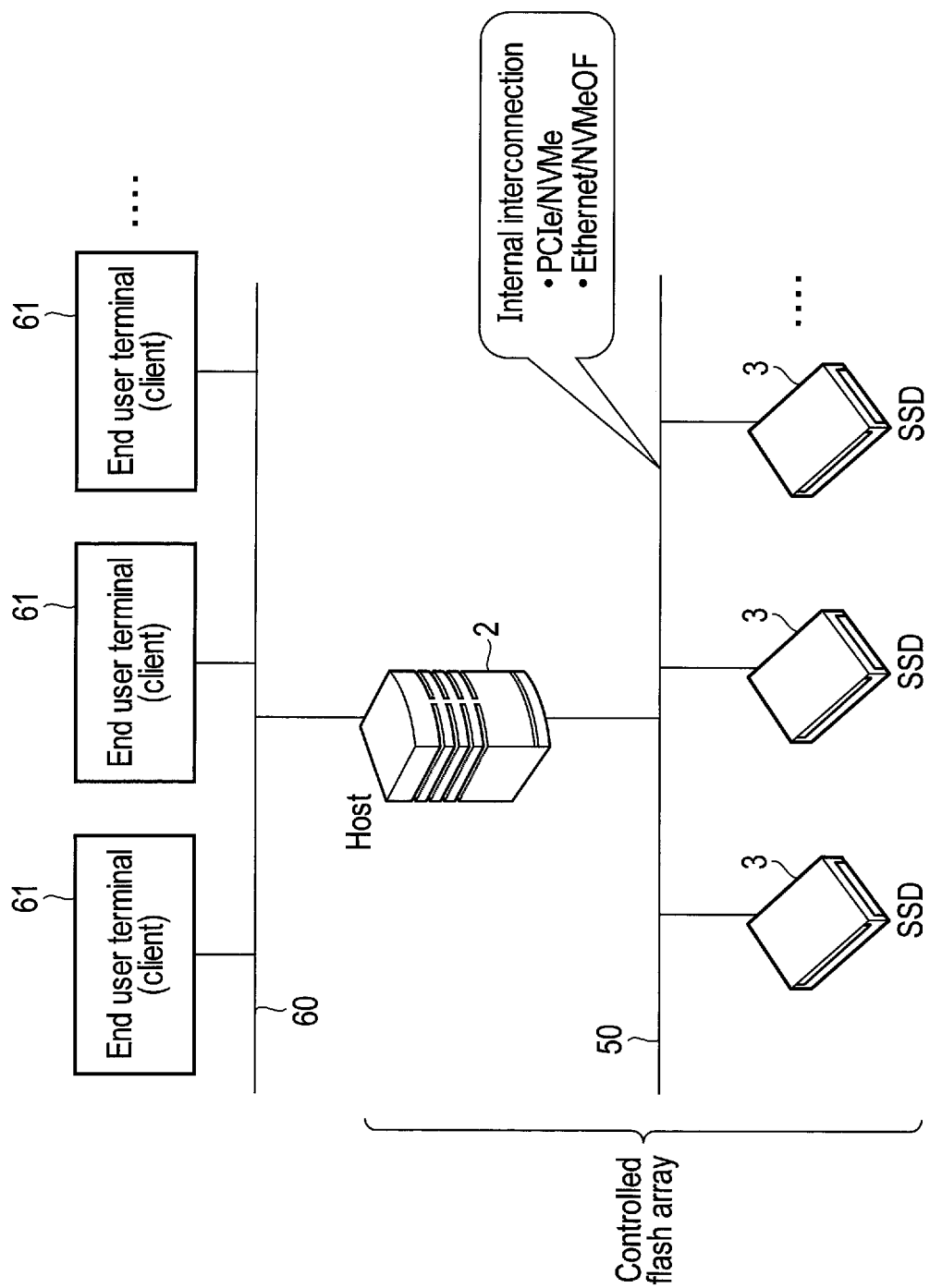
F I G. 1

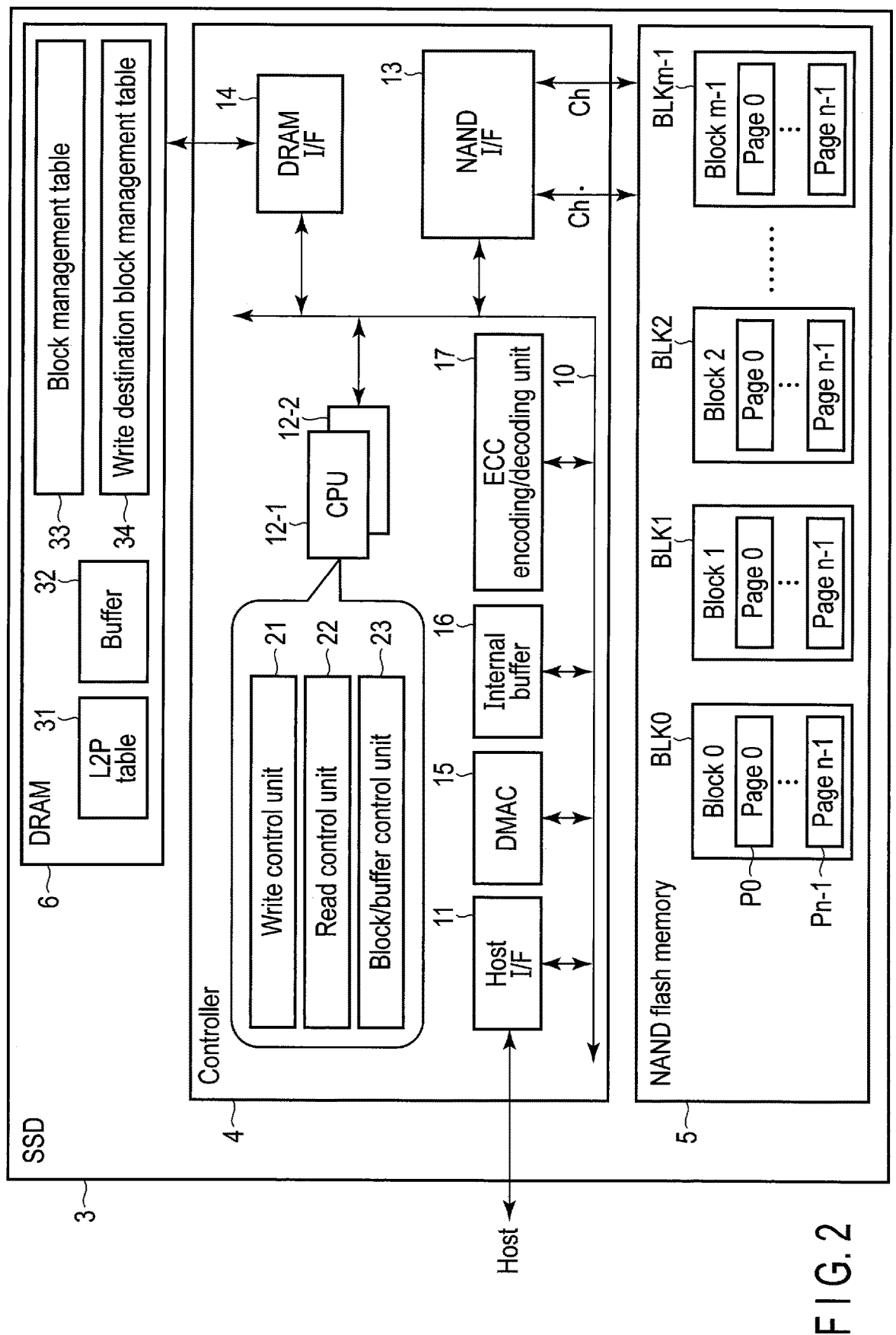
F I G. 2

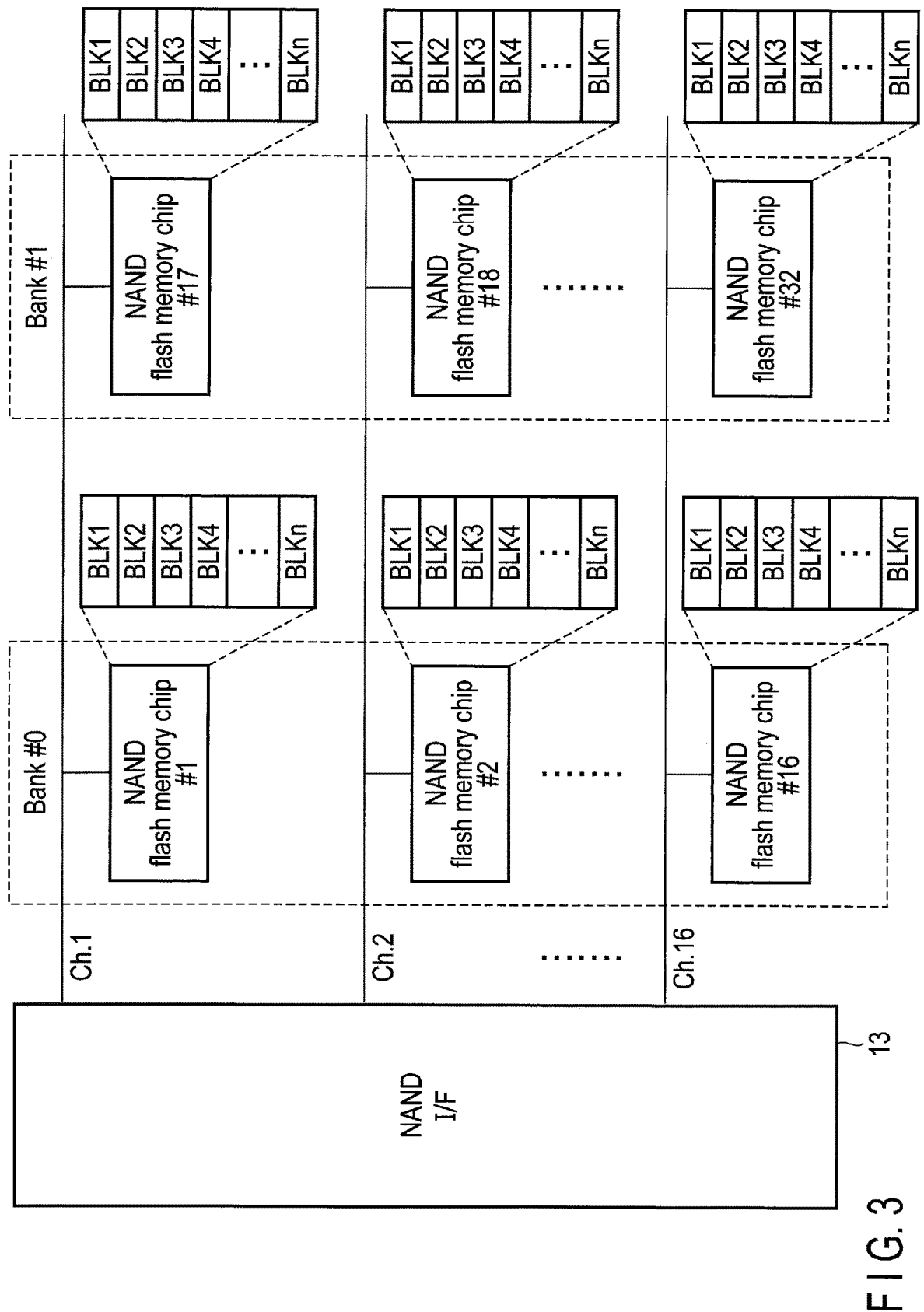
F I G. 3

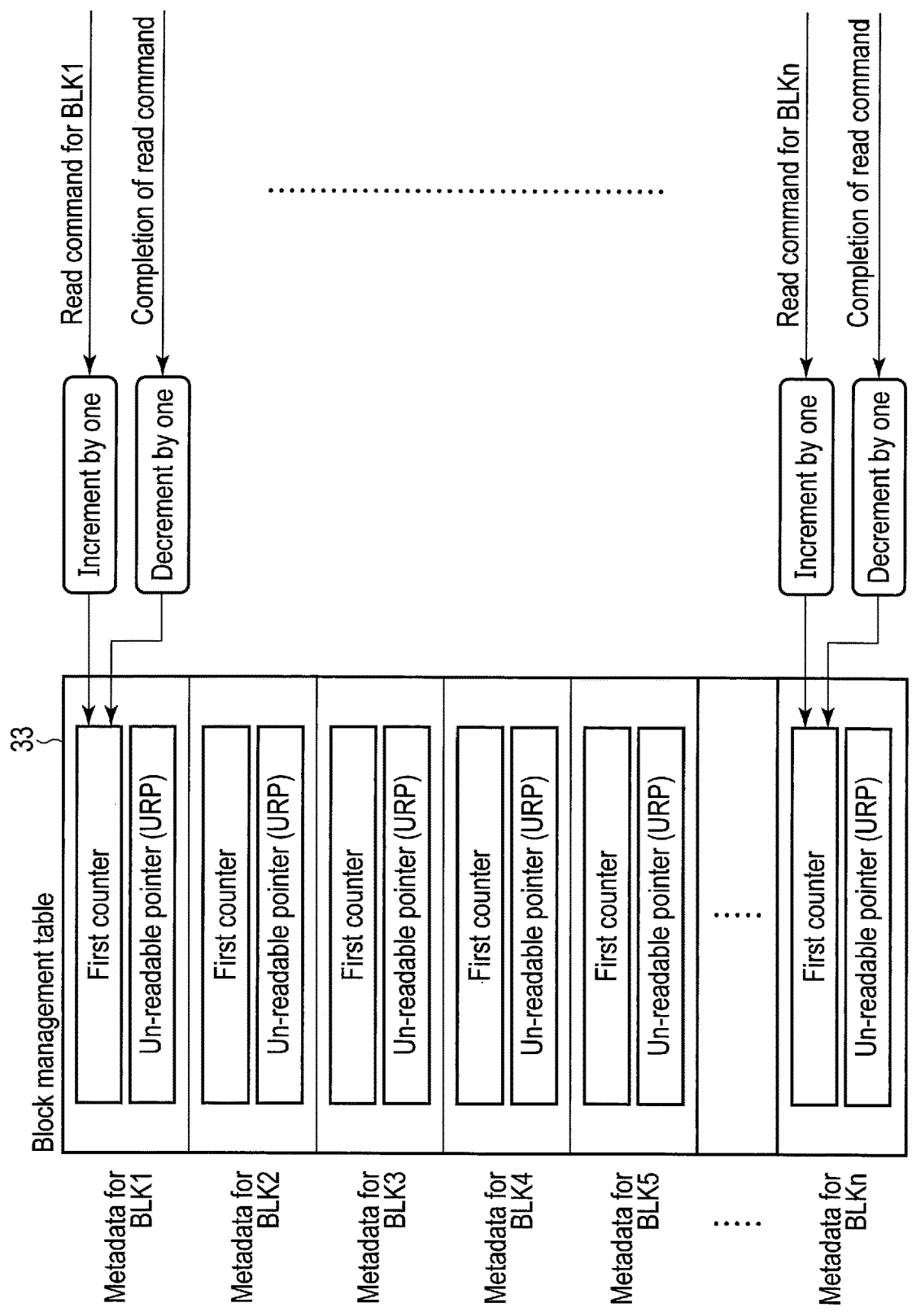
F I G. 5

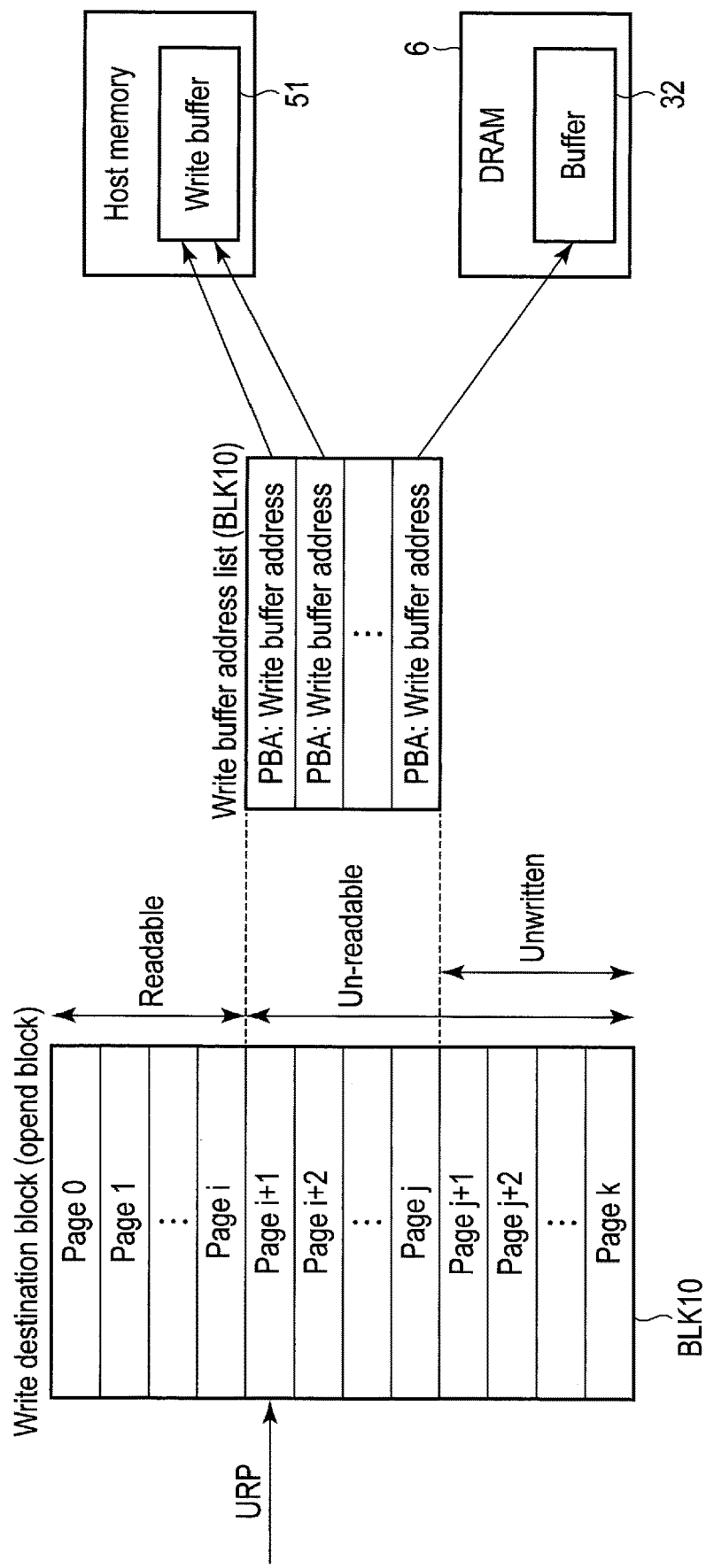
F I G. 9

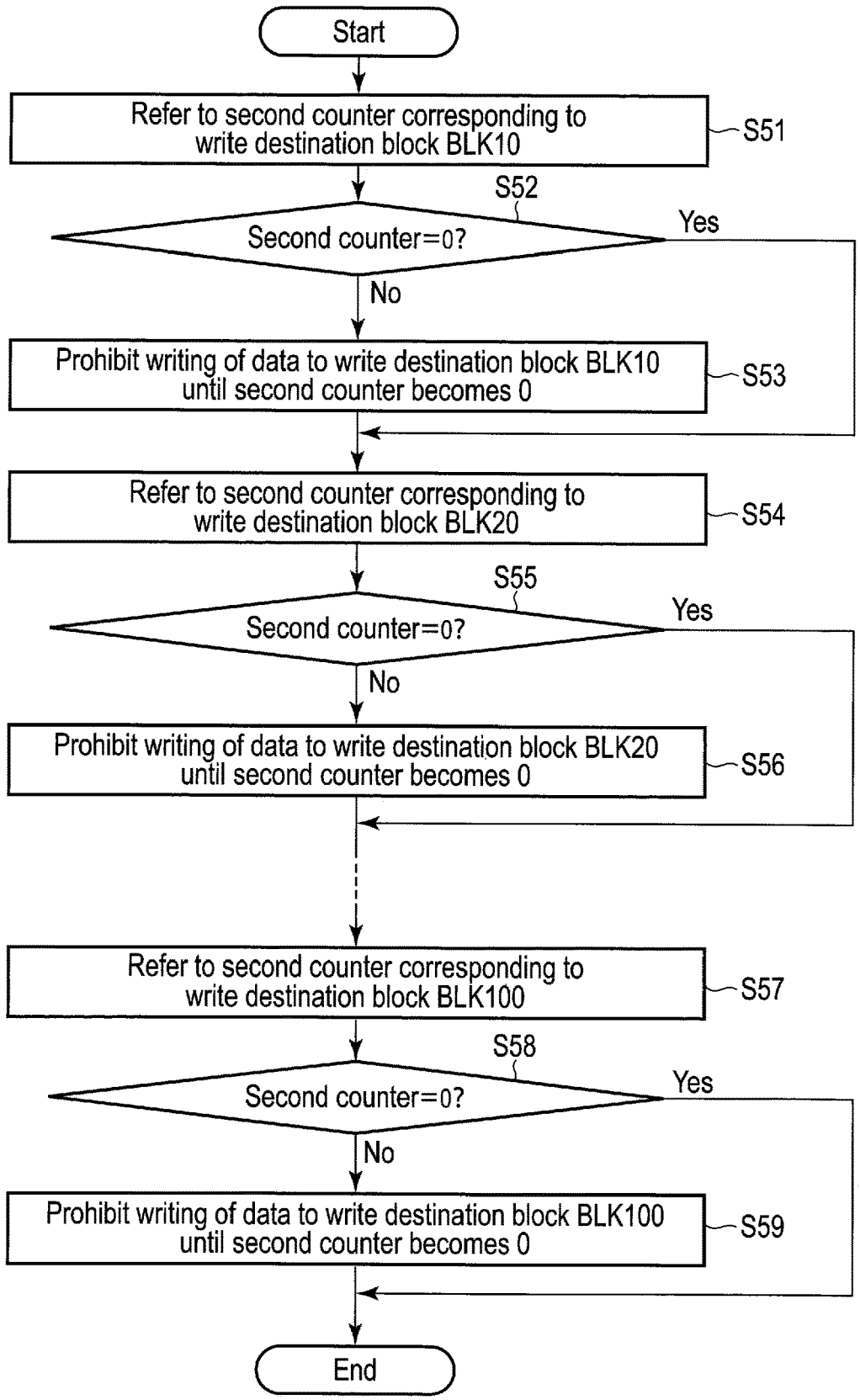
F I G. 14

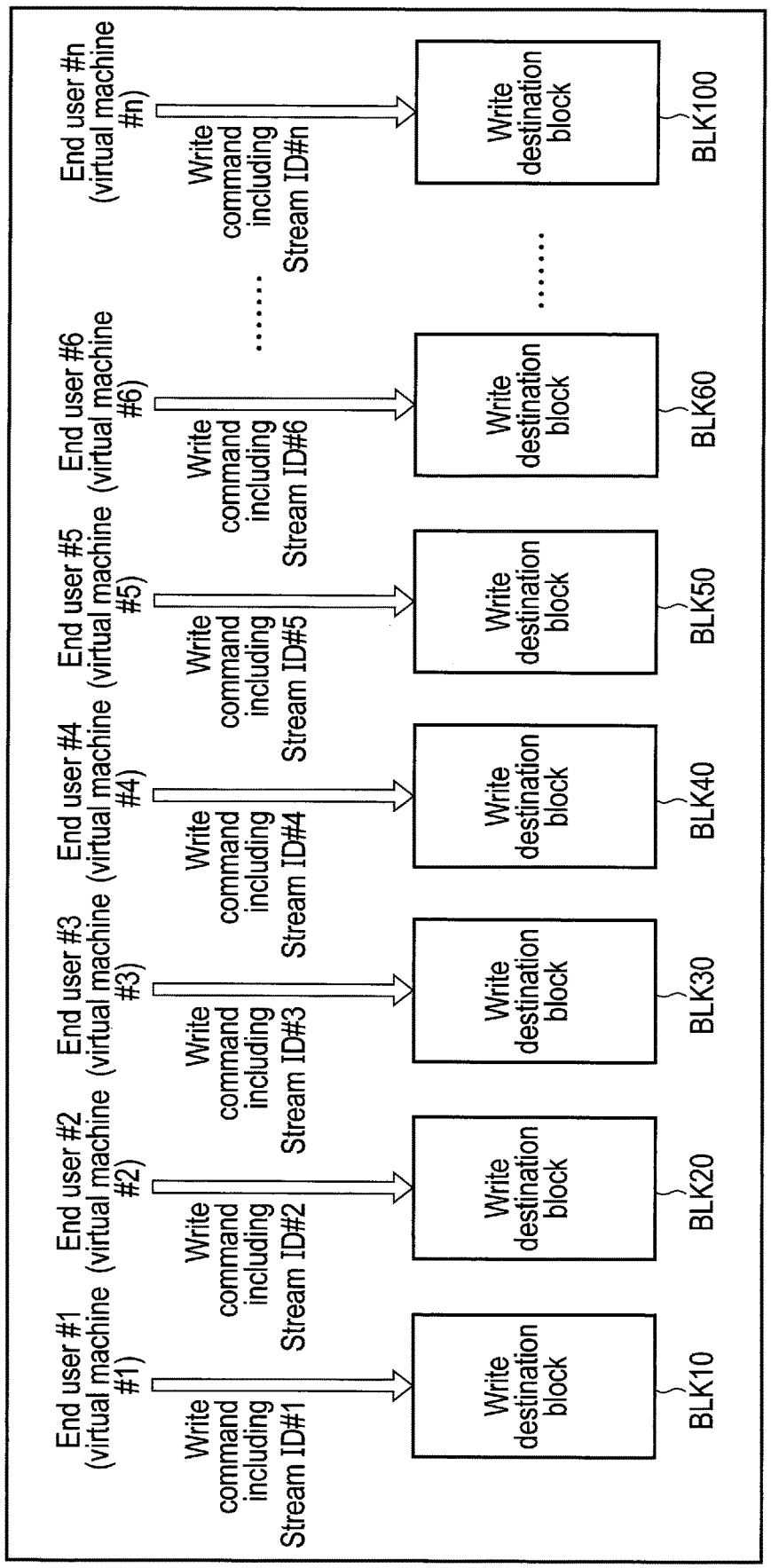
F I G. 15

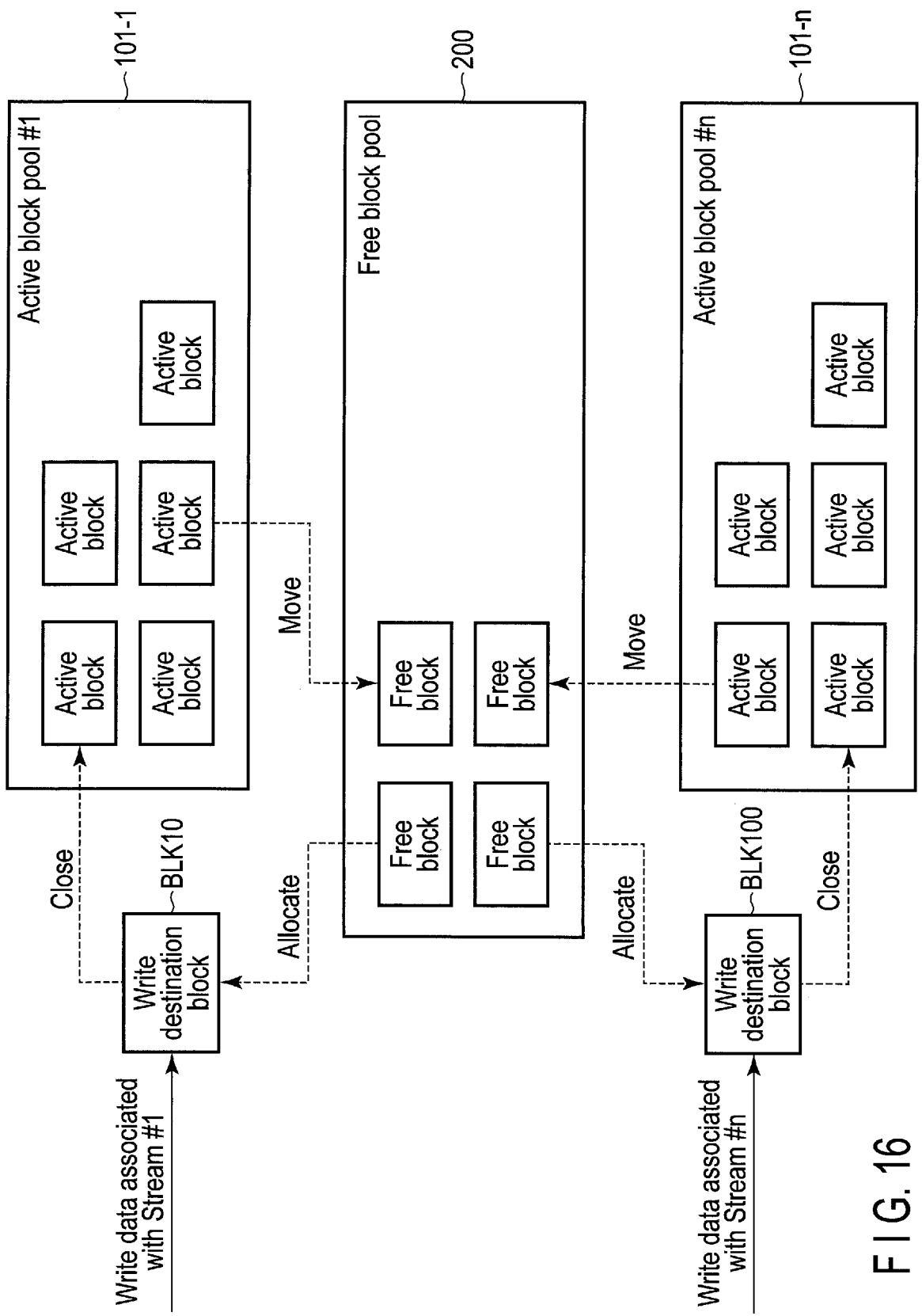
F I G. 16

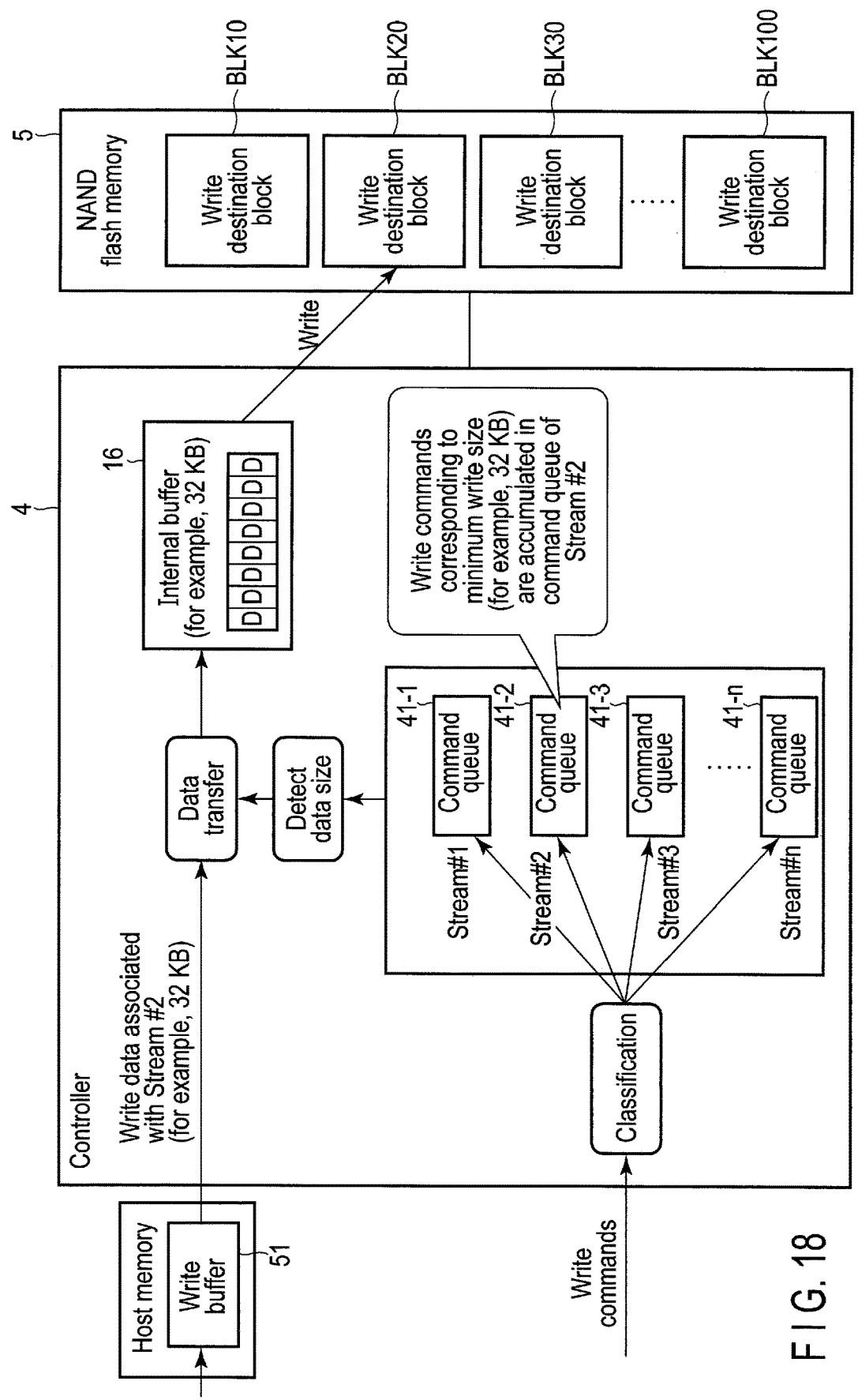
F I G. 18

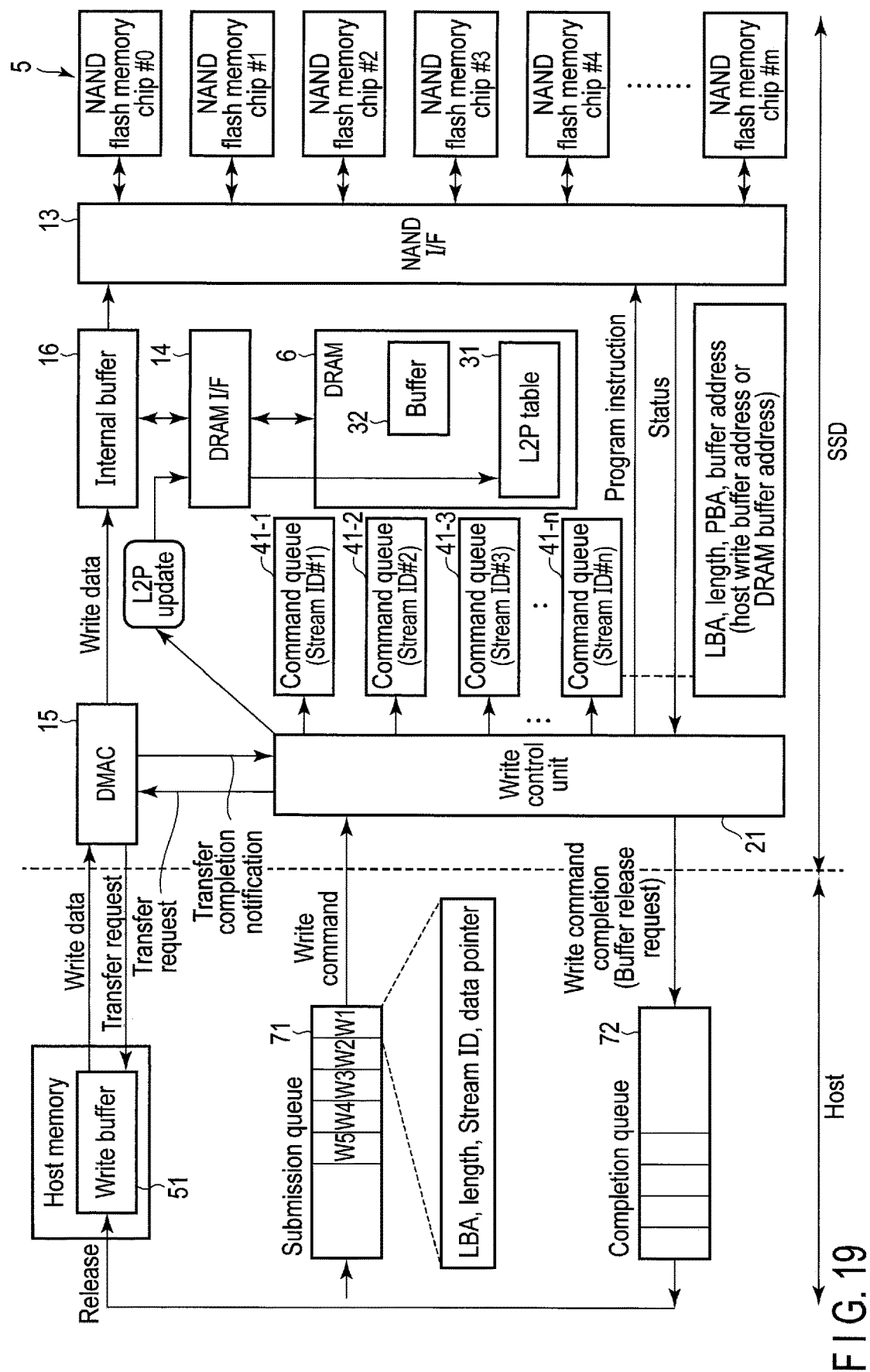
F I G. 19

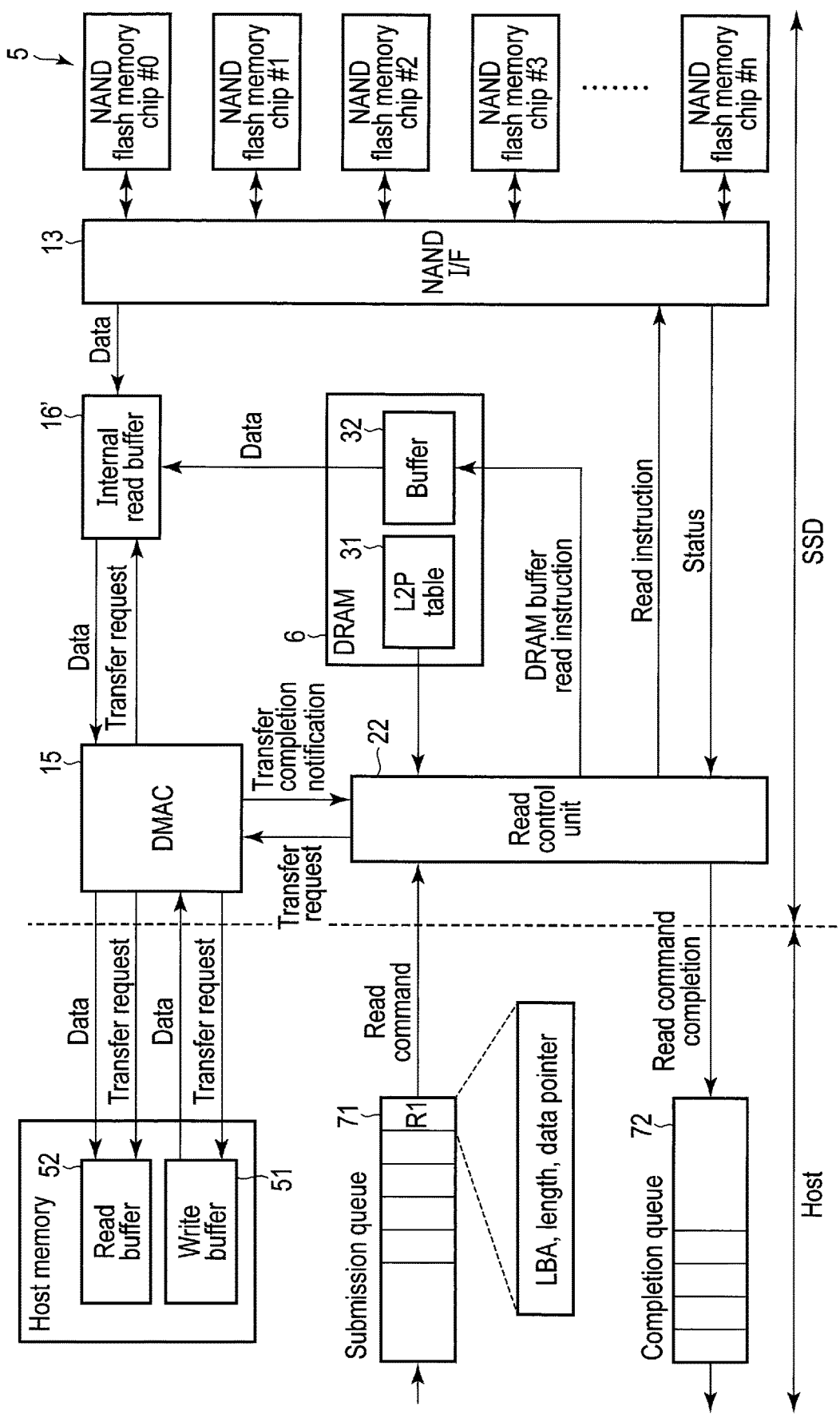
F I G. 21

MEMORY SYSTEM AND METHOD OF CONTROLLING NONVOLATILE MEMORY BY CONTROLLING THE WRITING OF DATA TO AND READING OF DATA FROM A PLURALITY OF BLOCKS IN THE NONVOLATILE MEMORY

CROSS-REFERENCE TO RELATED APPLICATIONS

This application is a continuation of and claims benefit under 35 U.S.C. § 120 to U.S. application Ser. No. 17/444,856, filed Aug. 11, 2021, which is a continuation of and claims benefit under 35 U.S.C. § 120 to U.S. application Ser. No. 16/815,970, filed Mar. 11, 2020 (now U.S. Pat. No. 11,119,701), and is based upon and claims the benefit of priority under 35 U.S.C. § 119 from Japanese Patent Application No. 2019-155833, filed Aug. 28, 2019, the entire contents of each of which are incorporated herein by reference.

FIELD

Embodiments described herein relate generally to a technology of controlling a nonvolatile memory.

BACKGROUND

In recent years, memory systems including a nonvolatile memory have been widely used. As one of such memory systems, a solid state drive (SSD) based on NAND flash technology is known.

The SSDs are used as storage devices in various host computer systems such as servers in data centers.

Storage devices used in host computer systems are required to improve their performances.

BRIEF DESCRIPTION OF THE DRAWINGS

FIG. 1 is a block diagram illustrating a relationship between a host and a memory system according to an embodiment.

FIG. 2 is a block diagram illustrating a configuration example of the memory system according to the embodiment.

FIG. 3 is a block diagram illustrating a relationship between a plurality of channels and a plurality of NAND flash memory chips used in the memory system according to the embodiment.

FIG. 5 is a diagram illustrating an example of a data structure of a block management table used in the memory system according to the embodiment.

FIG. 9 is a diagram illustrating an example of a write buffer address list in the write destination block management table.

FIG. 14 is a flowchart illustrating another procedure of the buffer release control processing which is executed in the memory system according to the embodiment.

FIG. 15 is a block diagram illustrating a stream writing operation which is used for writing a plurality of types of write data associated with a plurality of streams to a plurality of write destination blocks corresponding to the streams, respectively.

FIG. 16 is a block diagram illustrating an operation of allocating a plurality of write destination blocks corresponding to the plurality of streams from a group of free blocks.

FIG. 18 is a block diagram illustrating a writing operation executed in the memory system according to the embodiment.

FIG. 19 is a block diagram illustrating a configuration example of the host and the memory system according to the embodiment regarding data writing.

FIG. 21 is a block diagram illustrating a configuration example of each of the host and the memory system according to the embodiment regarding data reading.

DETAILED DESCRIPTION

Figure 4:
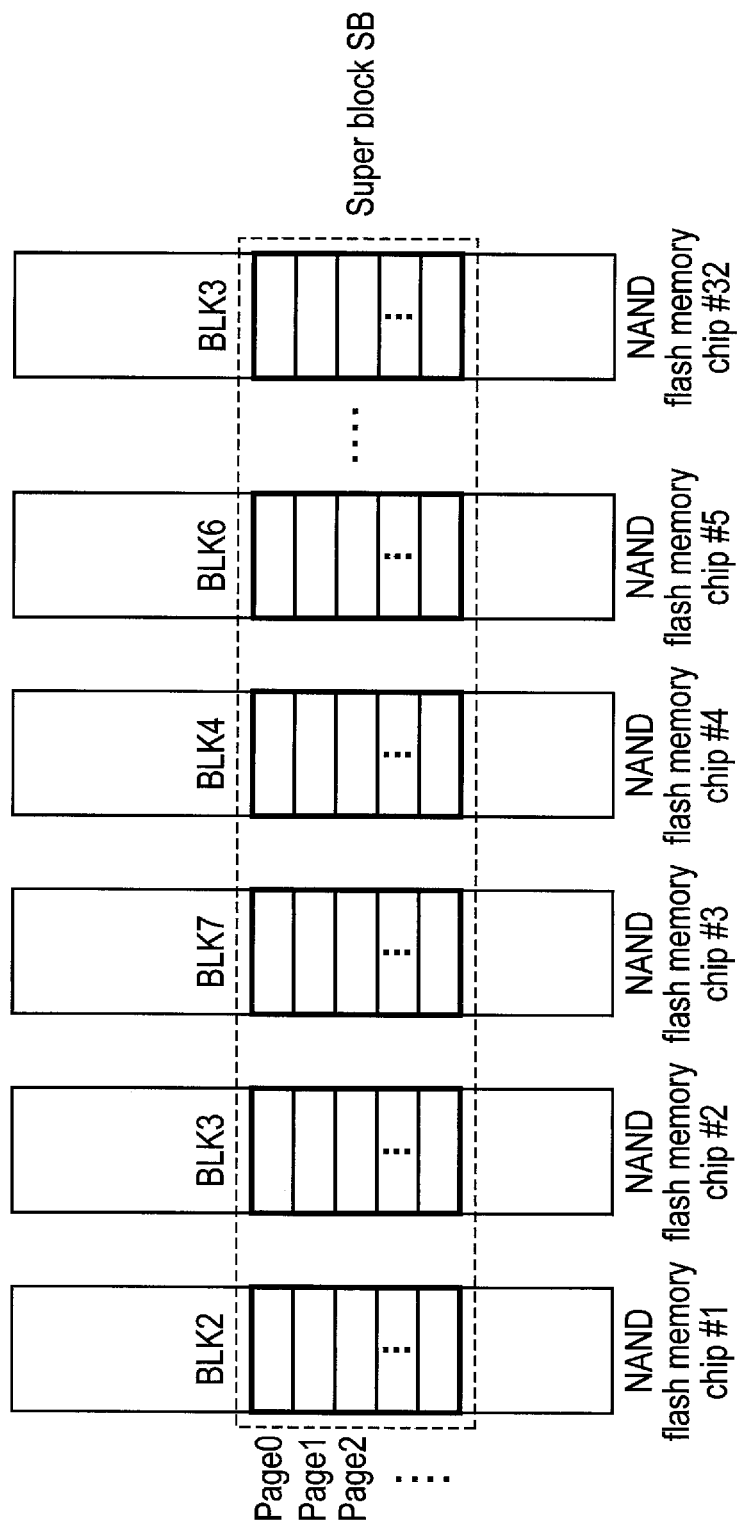
FIG. 4 is a diagram illustrating a configuration example of a certain super block used in the memory system according to the embodiment.

Various embodiments will be described hereinafter with reference to the accompanying drawings.

In general, according to one embodiment, a memory system connectable to a host includes a nonvolatile memory and a controller. The nonvolatile memory includes a plurality of blocks each including a plurality of pages, and reading of data written in one page of the plurality of pages of each block is enabled after writing of data to one or more pages subsequent to the one page. The controller is electrically connected to the nonvolatile memory and configured to write data to a plurality of write destination blocks allocated from the plurality of blocks.

In response to receiving a read command from the host, the controller increments a first counter value corresponding to a first block having a block address allocated to a logical address of read target data specified by the received read command, among a plurality of first counter values corresponding to the plurality of blocks.

The controller reads the read target data from the first block or a buffer depending on whether the read target data is readable from the first block, and decrements the first counter value corresponding to the first block after the reading has been finished. The buffer is a first buffer in the memory system or a write buffer of the host.

When the first block is a first write destination block of the plurality of write destination blocks and the read target data is not readable from the first write destination block, the controller increments a second counter value corresponding to the first write destination block among the plurality of second counter values corresponding to the plurality of write destination blocks, reads the read target data from the buffer, and decrements the second counter value corresponding to the first write destination block after the reading has been finished.

The controller prohibits processing for transitioning a block associated with an uncompleted read command to a state reusable as a new write destination block, on the basis of the first counter values. The controller prohibits release of a first region in the buffer, on the basis of the second counter values, the first region being a region that stores data being written or waiting for being written to a write destination block associated with an uncompleted read command that requires reading of data from the buffer.

FIG. 1 is a block diagram illustrating a relationship between the host and the memory system according to the embodiment.

This memory system is a semiconductor storage device configured to write data to a nonvolatile memory and read data from the nonvolatile memory. This memory system is realized as a solid state drive (SSD) 3 based on NAND flash technology.

The host (host device) 2 is configured to control a plurality of SSDs 3. The host 2 is realized by an information processing apparatus configured to use a flash array including a plurality of SSDs 3 as storage. This information processing apparatus may be a personal computer or a server computer.

Note that the SSD 3 may be used as one of a plurality of storage devices provided in a storage array. The storage array may be connected to an information processing apparatus such as a server computer via a cable or a network. The storage array includes a controller configured to control a plurality of storages (for example, a plurality of SSDs 3) in this storage array. When SSD 3 is applied to the storage array, the controller of this storage array may function as a host of the SSD 3.

Hereinafter, a case where the information processing apparatus such as the server computer functions as the host 2 will be described as an example.

The host (server) 2 and the plurality of SSDs 3 are interconnected via an interface 50 (internal interconnection). The interface 50 for this interconnection is not limited thereto, but includes PCI Express (PCIe) (registered trademark), NVM Express (NVMe) (registered trademark), Ethernet (registered trademark), NVMe over Fabrics (NVMeOF), and the like can be used.

A typical example of the server computer configured to function as the host 2 is a server computer in the data center (hereinafter referred to as a server).

In the case where the host 2 is realized by a server in the data center, this host (server) 2 may be connected to a plurality of end user terminals (clients) 61 via a network 60. The host 2 can provide various services to these end user terminals 61.

Examples of services that can be provided by the host (server) 2 include (1) Platform as a Service (PaaS) that provides a system running platform to each client (each end user terminal 61), and (2) Infrastructure as a Service (IaaS) that provides each client (each end user terminal 61) with an infrastructure such as a virtual server.

A plurality of virtual machines may be executed on a physical server functioning as this host (server) 2. Each of these virtual machines running on the host (server) 2 can function as a virtual server configured to provide various services to the client (end user terminal 61) corresponding to this virtual machine. In each virtual machine, an operating system and a user application used by the corresponding end user terminal 61 are executed. The operating system corresponding to each virtual machine includes I/O services. This I/O service may be a block I/O service based on a logical block address (LBA), or may be a key-value store service.

In the operating system corresponding to each virtual machine, the I/O service issues an I/O command (write command, read command) in response to a write/read request from a user application. These I/O commands are placed into a submission queue in the host 2 and sent to the SSD 3 via this submission queue.

The SSD 3 includes a nonvolatile memory such as a NAND flash memory. The SSD 3 can execute writing of data to each of a plurality of write destination blocks allocated from a plurality of blocks included in the nonvolatile memory. The write destination block means a block to which data is to be written.

The SSD 3 supports stream writing for writing a plurality of types of write data associated with different streams respectively to different write destination blocks. In the case of executing the stream writing, each write command sent from the host 2 to the SSD 3 includes a stream identifier (stream ID) indicating one of a plurality of streams. When the SSD 3 receives, from the host 2, a write command including a stream ID of a stream, the SSD 3 writes write data associated with this write command to a write destination block corresponding to this stream. When the SSD 3 receives, from the host 2, a write command including the stream ID of another stream, the SSD 3 writes write data associated with this write command to another write destination block corresponding to the other stream. When the entire write destination block corresponding to a stream is filled with data, a new write destination block for this stream is allocated.

Therefore, the host 2 can issue write commands each including a stream ID to the SSD 3 to achieve a data placement such that a specific data group such as, for example, data of a user application corresponding to a certain end user terminal 61 (client) is written in one or more specific blocks, and another specific data group such as data of a user application corresponding to another end user terminal 61 (client) is written in other one or more blocks.

FIG. 2 illustrates a configuration example of the SSD 3.

The SSD 3 includes a controller 4 and a nonvolatile memory (NAND flash memory) 5. The SSD 3 may also include a random access memory, for example, a DRAM 6.

A NAND flash memory 5 includes a memory cell array including a plurality of memory cells arranged in a matrix shape. The NAND flash memory 5 may be a NAND flash memory of a two-dimensional structure or a NAND flash memory of a three-dimensional structure.

The memory cell array of the NAND flash memory 5 includes a plurality of blocks BLK0 to BLKm−1. Each of the blocks BLK0 to BLKm−1 includes a plurality of pages (pages P0 to Pn−1 in this case). The blocks BLK0 to BLKm−1 function as erase units. The block may also be referred to as an "erase block", a "physical block", or a "physical erase block". Each of pages P0 to Pn−1 is a unit of a data writing operation and a data reading operation.

The controller 4 is electrically connected to the NAND flash memory 5, which is a nonvolatile memory, via a NAND interface 13 such as a Toggle NAND flash interface or an open NAND flash interface (ONFI). The controller 4 operates as a memory controller configured to control the NAND flash memory 5. This controller 4 may be realized by a circuit such as a System-on-a-chip (SoC).

As illustrated in FIG. 3, the NAND flash memory 5 may include a plurality of NAND flash memory chips (NAND flash memory dies). Each NAND flash memory chip can operate independently. Therefore, the NAND flash memory chips function as a unit that can operate in parallel. FIG. 3 illustrates a case where sixteen channels Ch.1 to Ch.16 are connected to the NAND interface 13, and two NAND flash memory chips are connected to each of the sixteen channels Ch.1 to Ch.16. In this case, the sixteen NAND flash memory chips #1 to #16 connected to the channels Ch.1 to Ch.16 may be organized as a bank #0, and remaining sixteen NAND type flash memory chips #17 to #32 connected to the channels Ch.1 to Ch.16 may be organized as a bank #1. The bank functions as a unit for operating a plurality of memory modules in parallel by bank interleaving. In the configuration example of FIG. 3, up to thirty-two NAND flash memory chips can be operated in parallel by the sixteen channels and bank interleaving using two banks.

An erasing operation may be executed in a unit of one block (physical block), or may be executed in a unit of a parallel unit (super block) including a set of a plurality of physical blocks that can be operated in parallel. One parallel unit, that is, one super block including a set of a plurality of physical blocks, is not limited thereto, but may include thirty-two physical blocks in total selected one by one from the NAND flash memory chips #1 to #32. Note that each of the NAND flash memory chips #1 to #32 may have a multi-plane configuration. For example, when each of the NAND flash memory chips #1 to #32 has a multi-plane configuration including two planes, one super block may include sixty-four physical blocks in total selected one by one from the sixty-four planes corresponding to the NAND flash memory chips #1 to #32.

FIG. 4 illustrates a super block (SB) including thirty-two physical blocks (a physical block BLK2 in the NAND flash memory chip #1, a physical block BLK3 in the NAND flash memory chip #2, a physical block BLK7 in the NAND flash memory chip #3, a physical block BLK4 in the NAND flash memory chip #4, a physical block BLK6 in the NAND flash memory chip #5, . . . , a physical block BLK3 in the NAND flash memory chip #32 in this case).

The write destination block may be one physical block or one super block. Note that a configuration in which one super block includes only one physical block may be used, and in this case, one super block is equivalent to one physical block.

Next, a configuration of the controller 4 in FIG. 2 will be described.

The controller 4 may function as a flash translation layer (FTL) configured to perform data management of the NAND flash memory 5 and block management of the NAND flash memory 5. The data management executed by this FTL includes (1) management of mapping information indicating correspondence between each of logical addresses and each of physical addresses of the NAND flash memory 5, and (2) processing for concealing restrictions on the NAND flash memory 5 (for example, reading/writing operation in page units and erasing operation in block units). logical addresses are addresses used by the host 2 for addressing a location in a logical address space of the SSD 3. As this logical address, LBA (logical block address (addressing)) can be used.

The management of mapping between each of logical addresses used by the host 2 to access the SSD 3 and each of physical addresses of the NAND flash memory 5 is performed by using an address translation table (logical-to-physical address translation table: L2P table) 31. The controller 4 manages mapping between each of the logical addresses and each of the physical addresses in a given management size unit, by using the L2P table 31. The physical address corresponding to a certain logical address indicates the latest physical storage location in the NAND flash memory 5 in which data corresponding to this logical address is written. The L2P table 31 may be loaded from the NAND flash memory 5 to the DRAM 6 when the SSD 3 is powered on.

In the NAND flash memory 5, data writing to a page can be performed only once per erase cycle. That is, new data cannot be directly overwritten in a region in a block in which data has already been written. Therefore, when updating already written data, the controller 4 writes new data in an unwritten region in the block (or another block) and treats the previous data as invalid data. In other words, the controller 4 writes update data corresponding to a certain logical address not to a physical storage location that stores the previous data corresponding to this logical address, but to another physical storage location. Then, the controller 4 updates the L2P table 31 to associate this logical address with this another physical storage location and invalidates the previous data. In the present embodiment, the update of the L2P table 31 may be executed after data to be written (write data) is written in the NAND flash memory 5, or may be executed after the write data is transferred from the host 2 or, alternatively, may be executed after a write command is received from the host 2.

The block management includes management of defective blocks (bad blocks), wear leveling, and garbage collection (GC), and the like. The wear leveling is an operation for leveling the number of times of rewriting (the number of program/erase cycles) of the blocks.

The GC is an operation for increasing the number of free blocks. The free block means a block that does not contain valid data. In the GC, the controller 4 copies valid data in several blocks including valid data and invalid data together to another block (for example, a free block). Here, valid data means data associated with a certain logical address. For example, data referenced from the L2P table 31 (that is, data linked as the latest data from the logical address) is valid data, and may be read from the host 2 later. Invalid data means data that is not associated with any logical address. Data that is not associated with any logical address is data that can no longer be read from the host 2. Then, the controller 4 updates the L2P table 31 and maps each logical address of the copied valid data to the physical address of the copy destination. A block having only invalid data by copying valid data to another block is released as a free block. As a result, this block can be reused after the erasing operation for this block is executed.

The controller 4 includes a host interface 11, a CPU 12-1, a CPU 12-2, a NAND interface 13, a DRAM interface 14, a direct memory access controller (DMAC) 15, an internal buffer 16, an ECC encoding/decoding unit 17, and the like. The host interface 11, the CPU 12-1, the CPU 12-2, the NAND interface 13, the DRAM interface 14, the direct memory access controller (DMAC) 15, the internal buffer 16, and the ECC encoding/decoding unit 17 are interconnected via a bus 10.

This host interface 11 is a host interface circuit configured to execute communication with the host 2. This host interface 11 may be, for example, a PCIe controller (NVMe controller). Alternatively, in a configuration in which the SSD 3 is connected to the host 2 via Ethernet (registered trademark), the host interface 11 may be an NVMe over Fabrics (NVMeOF) controller.

The host interface 11 receives various commands from the host 2. These commands include a write command, a read command, a deallocation (unmap/trim) command, and various other commands.

The write command is a command (write request) for writing data to be written (write data) to the NAND flash memory 5. For example, a write command for stream writing includes a logical address (start LBA) of data to be written (write data), the length of this write data, a stream identifier (stream ID) indicating a stream associated with this write data, a data pointer indicating a location in the write buffer in the memory of the host 2 in which this write data is stored.

The read command is a command (read request) for reading data from the NAND flash memory 5, and includes the logical address (start LBA) of data to be read, the length of this data, a data pointer indicating a location in the read buffer in the memory of the host 2 to which this data is to be transferred.

The deallocation (unmap/trim) command is a command for invalidating data corresponding to a certain logical address. The deallocation (unmap/trim) command specifies a logical address range (LBA range) to be invalidated.

Each of the CPUs 12-1 and 12-2 is a processor configured to control the host interface 11, the NAND interface 13, and the DRAM interface 14. Each of the CPUs 12-1 and 12-2 loads a control program (firmware) from the NAND flash memory 5 or ROM, not illustrated, into the DRAM 6 in response to the power-on of the SSD 3, and performs various processing by executing this firmware. Note that the firmware may be loaded on an SRAM, not illustrated, in the controller 4. Each of the CPUs 12-1 and 12-2 can execute command processing for processing various commands from the host 2. The operation of each of the CPUs 12-1 and 12-2 is controlled by the above-described firmware. Note that part or all of the command processing may be executed by dedicated hardware in the controller 4. The command processing for one command includes a plurality of types of processing. Execution of the plurality of types of processing may be shared by the CPUs 12-1 and 12-2, or may be achieved by either one of the CPUs.

At least one of the CPUs 12-1 and 12-2 can function as a write control unit 21, a read control unit 22, and a block/buffer control unit 23. Note that some or all of the write control unit 21, the read control unit 22, and the block/buffer control unit 23 may be realized by dedicated hardware in the controller 4.

The write control unit 21 executes processing for writing the write data associated with the write command to the NAND flash memory 5 in response to the write command received from the host 2. The write control unit 21 supports the above-described stream writing operation. The write control unit 21 can allocate a plurality of write destination blocks corresponding to the plurality of streams from the plurality of blocks of the NAND flash memory 5, and manage the allocated plurality of write destination blocks.

In many modern NAND flash memories, complicated writing operations are often performed to reduce program disturb. For this reason, in the many modern NAND flash memories, reading of data written to one page among a plurality of pages in a block is enabled after writing of data to one or more pages following this page. The timing at which reading of the data of each page is enabled differs depending on the writing method applied to the NAND flash memory.

For example, in a triple level cell (TLC)-flash memory that can store 3 bits of data per memory cell, a lower page, a middle page, and an upper page are allocated to a set of memory cells connected to a word line WL0, a lower page, a middle page, and an upper page are allocated to a set of memory cells connected to a next word line WL1, a lower page, a middle page, and an upper page are allocated to a set of memory cells connected to a next word line WL2, a lower page, a middle page, and an upper page are allocated to a set of memory cells connected to a next word line WL3, and a lower page, a middle page, and an upper page are allocated to a set of memory cells connected to a last word line WLn. In the memory cell group connected to each word line, data cannot be correctly read out from each of the lower page and the middle page until the writing operation for the upper page is completed.

Further, in the NAND flash memory, a page writing order indicating the order of pages necessary for writing data to the block is defined. For example, in the TLC-flash memory, in order to suppress an impact of the program disturb, the page writing order is defined so that the writing operations for several adjacent word lines are executed alternately.

For example, writing operation is executed in a writing order such as writing to the lower page of the WL0, writing to the lower page of the WL1, writing to the middle page of the WL0, writing to the lower page of the WL2, writing to the middle page of the WL1, writing to the upper page of the WL0, writing to the lower page of the WL3, writing of the middle page of the WL2, and writing to the upper page of the WL1. For this reason, reading of data written to one page of a plurality of pages in a block is enabled after writing of data to some pages following this page.

In the present embodiment, the nonvolatile memory includes a plurality of blocks each including a plurality of pages, and enabling reading of data written to one page among the plurality of pages of each block after writing of data to one or more pages subsequent to this one page, and is used as the NAND flash memory 5.

The write control unit 21 is configured to write data to a plurality of write destination blocks allocated from the plurality of blocks of the NAND flash memory 5. Writing of data to each of the write destination blocks is executed according to the above-described page writing order. The write control unit 21 receives write commands from the host 2 and executes the writing operation for writing the write data associated with each write command to the NAND flash memory 5. The writing operation includes: (1) an address allocating operation for allocating a physical address indicating a storage location in the NAND flash memory 5 where the write data is to be written to this write data, (2) an L2P updating operation for updating the L2P table 31 such that the physical address allocated to this write data is associated with the logical address of this write data; (3) a data transfer operation for transferring the write data from a write buffer in the memory of the host 2 to the controller 4; and (4) a flash writing operation (programming operation) for writing the write data, which is transferred from the write buffer in the memory of the host 2, to the write destination block.

In the present embodiment, as described above, the write control unit 21 supports stream writing for writing write data associated with different streams to different write destination blocks, respectively. Since each write command received from the host 2 includes a stream ID, the write control unit 21 can identify which stream the write data associated with each write command is associated with.

The read control unit 22 receives a read command from the host 2 and reads read target data specified by this received read command from the NAND flash memory 5, a first buffer in the SSD 3, or the write buffer in the memory of the host 2. The first buffer in the SSD 3 is a buffer for temporarily storing write data received from the host 2. Examples of this first buffer include a buffer 32 in the DRAM 6.

When the read target data specified by the read command received from the host 2 can be read from a read target block among the plurality of blocks of the NAND flash memory 5, the read control unit 22 reads the read target data from this read target block, and sends, to the host 2, this read target data read from the read target block. This read target block is a block having a block address represented by a physical address allocated to the logical address of this read target data.

On the other hand, when this read target block is a block that is currently used as a write destination block and the physical storage location allocated to the logical address of the read target data is an un-readable region in this write destination block, the read control unit 22 reads the read target data from the first buffer in the SSD 3 or the write buffer of the host 2, and sends, to the host 2, the read target data read from the first buffer or the write buffer of the host 2.

In this manner, when the read target data specified by the read command is not readable from the NAND flash memory 5, the read control unit 22 reads the read target data from the first buffer in the SSD 3 or the write buffer of the host 2. Accordingly, even when data being written to a certain write destination block or data which is not started to be written and is waiting for being written to this write destination block is requested by a read command from the host 2, this data can be returned to the host 2. Therefore, it is possible to improve the performance related to data reading.

In the present embodiment, to make read target data specified by the read command readable normally from a block from which this read target data is to be read or buffer (the first buffer in the SSD 3 or the write buffer in the host 2), a plurality of first counter values corresponding to a plurality of blocks in the NAND flash memory 5 and the plurality of second counter values corresponding to the plurality of write destination blocks are managed.

The plurality of first counter values are used to enable data to be correctly read from each block that may be used as a data reading source. The plurality of second counter values are used to enable data to be correctly read from the buffer.

In the present embodiment, the read control unit 22 performs the following operations.

When the read control unit 22 receives a read command from the host 2, the read control unit 22 increments a first counter value corresponding to a read target block among the plurality of first counter values corresponding to the plurality of blocks, for example, by one. The read target block is a block having a block address allocated to a logical address of read target data specified by the received read command.

The read control unit 22 reads the read target data from the read target block or buffer (the first buffer in the SSD 3 or the write buffer of the host 2) depending on whether or not the read target data can be read from this read target block, and decrements the first counter value corresponding to the read target block, for example, by one, after the reading of the read target data has been finished.

When the read target block is one write destination block among the plurality of write destination blocks and the read target data is not readable from the read target block (this one write destination block), the read control unit 22 increments a second counter value corresponding to this one write destination block among the plurality of second counter values corresponding to the plurality of write destination blocks, for example, by one, reads the read target data from the buffer, and decrements the second counter value corresponding to this one write destination block, for example, by one, after the reading of the read target data has been finished.

Therefore, each first counter value represents the number of uncompleted read commands for the corresponding block. Each second counter value indicates the number of uncompleted read commands that cannot read the read target data from the corresponding write destination block and that requires reading of the read target data from the buffer.

The block/buffer control unit 23 uses the first counter values and the second counter values to prevent this data from becoming un-readable from the block determined as the data reading source, and in addition, prevent this data from becoming un-readable from the buffer determined as the data reading source.

That is, the block/buffer control unit 23 prohibits processing for transitioning a state of a block associated with an uncompleted read command to a state reusable as a new write destination block, on the basis of the plurality of first counter values. The block associated with an uncompleted read command means a block in which an uncompleted read command for the block exists. Furthermore, the block/buffer control unit 23 prohibits release of a first region in the buffer, on the basis of the plurality of second counter values. The first region is a region that stores data being written or data waiting for being written to a write destination block associated with an uncompleted read command that requires reading of data from the buffer. The write destination block associated with an uncompleted read command means a write destination block in which an uncompleted read command for the write destination block exists.

Specifically, the block/buffer control unit 23 executes the following processing.

When there is no more valid data left in a certain block among the plurality of blocks in the NAND flash memory 5, the block/buffer control unit 23 transitions this block to a state reusable as a new write destination block after there is no more uncompleted read command left for this block, in other words, after the first counter value corresponding to this block among the plurality of the first counter values has become zero. The processing for transitioning a state of a block to a state reusable as a new write destination block includes processing for adding the block to a list of free blocks or processing for executing the erasing operation on this block. Since a certain block is determined as a data reading source until data is actually read from this block, a certain period of time is required. Therefore, when this data has not been read from the block determined as the data reading source, there is an uncompleted read command left for this block.

In this case, even when this block becomes a block which does not include valid data any longer due to data update, garbage collection, or deallocation (trim/unmap), execution of the processing for transitioning a state of this block to a state reusable as a new write destination block is prohibited until there is no more uncompleted read command for this block, that is, until all the data reading from this block is completed.

Therefore, in the present embodiment, it is possible to prevent an occurrence of a situation in which the data cannot be correctly read from a block determined as the data reading source due to conflict between the data reading from the block and a reuse request for the block.

Further, when write data becomes unnecessary from the buffer (the first buffer in the SSD 3 or the write buffer in the host 2) due to a progress of the writing operation to a certain write destination block, the block/buffer control unit 23 permits release of a region in the buffer that stores this write data after the second counter value corresponding to this write destination block has become zero.

In other words, when there is an uncompleted read command left for the un-readable region of a certain write destination block among the plurality of write destination blocks, release of a region in the buffer that stores write data to be written in the un-readable region of this write destination block is prohibited, until there is no more uncompleted read command left for the un-readable region of this write destination block.

Since a buffer (a first buffer in the SSD 3 or a write buffer of the host) is determined as a data reading source until data is actually read from this buffer, a certain period of time is required. Therefore, when this data has not been read from the buffer determined as the data reading source, there is an uncompleted read command for the un-readable region of this write destination block.

In this case, even when the writing of this data is completed by the progress of the data writing operation to this write destination block, release of a region in the buffer that stores write data to be written to this write destination block is prohibited until there is no more uncompleted read command left for the un-readable region of this write destination block. Write data to be written to this write destination block is data that has not been made readable from this write destination block when the buffer is determined as the reading source, that is, write data being written to the write destination block, or write data which is not started to be written and is waiting for being written to the write destination block.

Therefore, in the present embodiment, it is possible to prevent an occurrence of a situation in which data cannot be correctly read from the buffer determined as the data reading source due to the conflict between the reading of this data from the buffer and the release request of the region of the buffer that stores this data.

The NAND interface 13 is a memory control circuit configured to control the NAND flash memory 5 under the control of the CPU 12-1 or the CPU 12-2.

The DRAM interface 14 is a DRAM control circuit configured to control the DRAM 6 under the control of the CPU 12-1 or the CPU 12-2. A part of the storage region of the DRAM 6 may be used as a storage region for the L2P table 31 and the buffer 32. Further, another part of the storage region of the DRAM 6 may be used for storing a block management table 33 and a write destination block management table 34.

The DMAC 15 executes data transfer between the memory of the host 2 and the internal buffer 16 (or the buffer 32 of the DRAM 6) under the control of the CPU 12-1 or the CPU 12-2. The internal buffer 16 may be realized by an SRAM in the controller 4.

When data is to be written to the NAND flash memory 5, the ECC encoding/decoding unit 17 adds an error correction code (ECC) to this data as a redundant code by encoding (ECC encoding) the data (data to be written). When data is read from the NAND flash memory 5, the ECC encoding/decoding unit 17 performs error correction of this data using the ECC added to the read data (ECC decoding).

FIG. 5 illustrates an example of the data structure of the block management table 33 stored in the DRAM 6. Hereinafter, the first counter values and the second counter values described above will be specifically described.

The block management table 33 includes a plurality of regions respectively corresponding to all the blocks in the NAND flash memory 5 (the blocks BLK1 to BLKn in this case). These blocks BLK1 to BLKn include a plurality of blocks in the middle of writing (opened blocks: write destination blocks), a plurality of blocks entirely filled with data and containing valid data (closed blocks: active blocks), and a plurality of free blocks that do not contain valid data.

Each region in the block management table 33 stores metadata regarding a block corresponding to this region. For example, metadata of a region corresponding to the block BLK1 indicates a first counter value indicating the number of uncompleted read commands determined to be read from the block BLK1 as a reading source, and an un-readable pointer (URP) indicating an un-readable minimum physical address in the block BLK1. Metadata of a region corresponding to the block BLK2 indicates a first counter value indicating the number of uncompleted read commands determined to be read from the block BLK2 as a reading source, and an un-readable pointer (URP) indicating the un-readable minimum physical address in the block BLK2. Similarly, metadata of a region corresponding to the block BLKn indicates a first counter value indicating the number of uncompleted read commands determined to be read from the block BLKn as a reading source, and an un-readable pointer (URP) indicating the un-readable minimum physical address in the block BLKn.

The block/buffer control unit 23 manages the presence or absence of an uncompleted read command for each of the block BLK1 to the block BLKn using a plurality of first counter values corresponding to the block BLK1 to the block BLKn.

The block/buffer control unit 23 increments the first counter value corresponding to the block BLK1, for example, by one, each time a read command for the block BLK1 is received for the block BLK1, and decrements the first counter value corresponding to the block BLK1, for example, by one, each time the read command for the block BLK1 is completed.

Similarly, the block/buffer control unit 23 increments the first counter value corresponding to the block BLKn, for example, by one, each time a read command for the block BLKn is received, and decrements the first counter value corresponding to the block BLKn, for example, by one, each time the read command for the block BLKn is completed.

Figure 6:
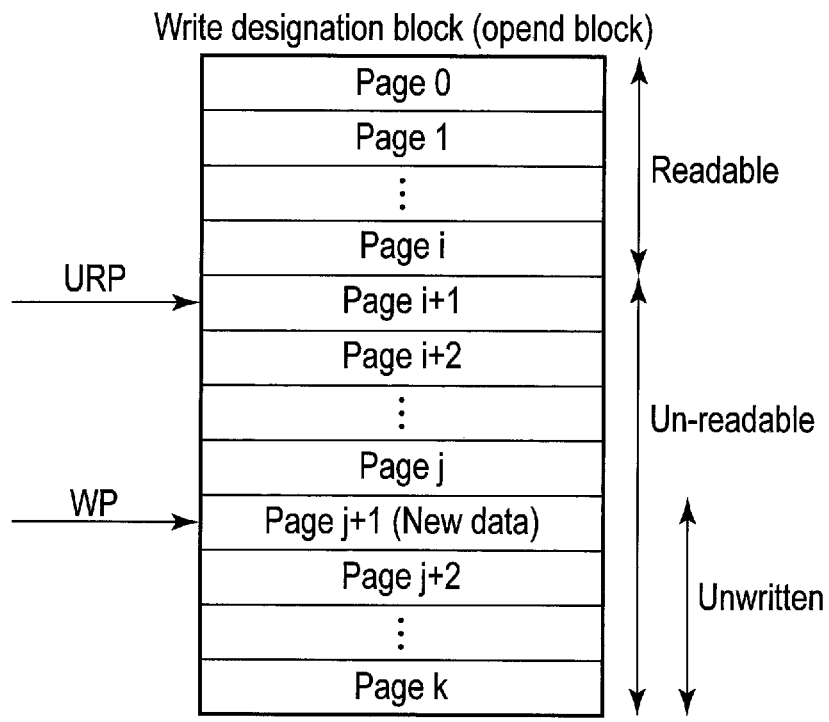
FIG. 6 is a diagram for explaining an un-readable pointer (URP) corresponding to each write destination block.

FIG. 6 is a diagram for explaining an un-readable pointer (URP) corresponding to each write destination block.

In each write destination block, two pointers: an unreadable pointer (URP) and a write pointer (WP) are managed. A WP corresponding to a certain write destination block indicates a physical storage location (page address) in this write destination block where data is to be written next. As described above, the URP corresponding to a certain write destination block indicates the un-readable minimum physical address in this write destination block. FIG. 6 illustrates a case where the physical storage location where data is to be written next is a page j+1, and the un-readable minimum physical address is page i+1. A page range corresponding to page 0 to page i is a readable region in which data can be normally read from this write destination block, and a page range corresponding to page i+1 to a last page k is an un-readable region in which data cannot be normally read from this write destination block.

Of the un-readable region, a page range corresponding to page i+1 to page j is a region in the middle of writing, and a page range corresponding to page j+1 to page k is an unwritten region where writing has not started.

New data is written to the page specified by WP. When data is written to the page specified by the WP, the URP is updated, and in addition, the WP is also updated.

Figure 7:
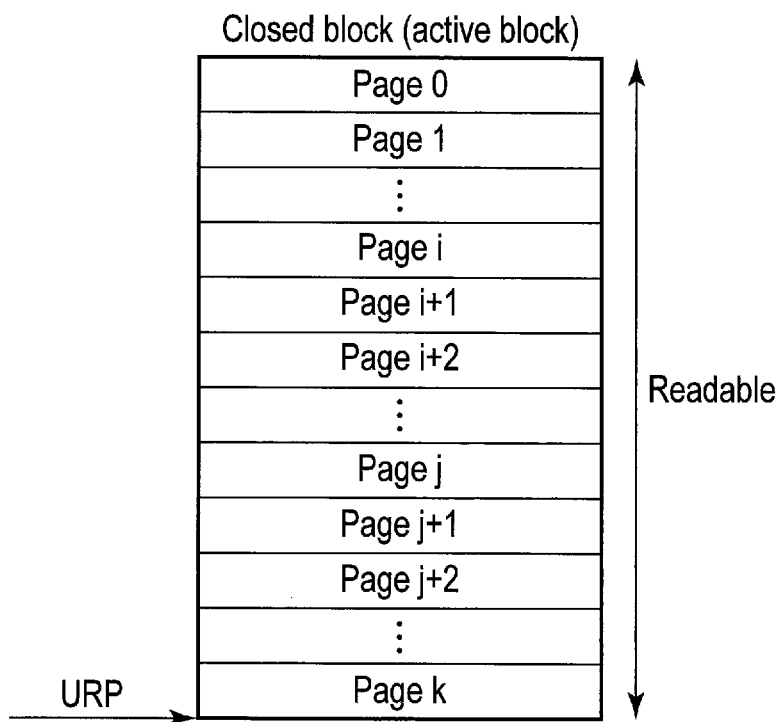
FIG. 7 is a diagram for explaining an un-readable pointer (URP) corresponding to each active block (closed block).

FIG. 7 is a diagram for explaining an un-readable pointer (URP) corresponding to each active block (closed block).

The URP of any active block indicates a value larger than a physical address at the end of the block (last page address in the block).

Therefore, the controller 4 needs simply to compare the physical storage location (for example, the read target page) allocated to a logical address of the read target data specified by the read command received from the host 2 with the URP of the read target block to make it possible to immediately determine whether or not this read target data can be read from this read target block, that is, whether this physical storage location (for example, the read target page) belongs to the readable region or the un-readable region of this block.

Figure 8:
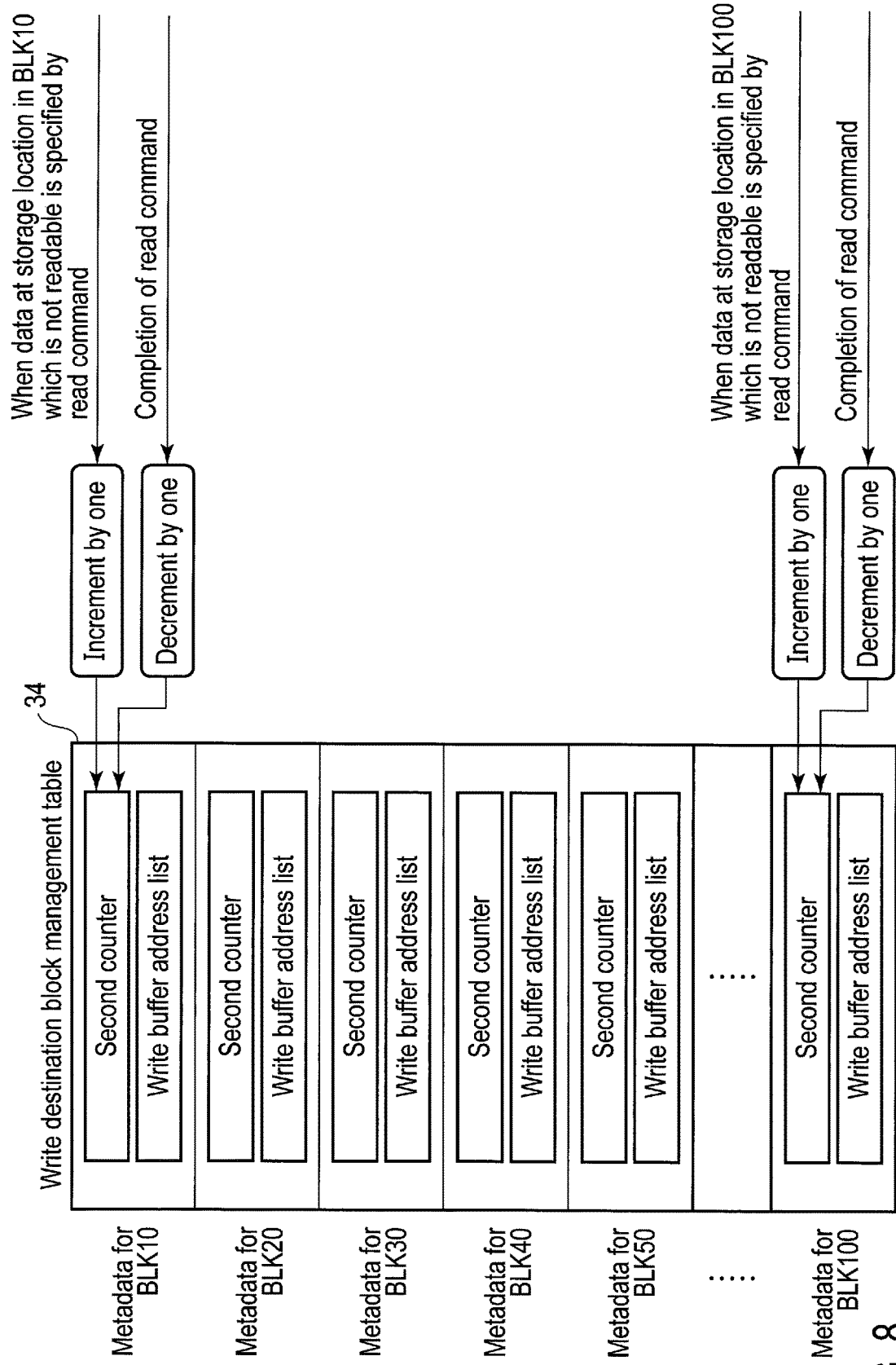
FIG. 8 is a diagram illustrating an example of a data structure of a write destination block management table used in the memory system according to the embodiment.

FIG. 8 illustrates an example of the data structure of the write destination block management table 34.

The write destination block management table 34 has a plurality of regions corresponding respectively to a plurality of blocks currently used as write-destination blocks (the block BLK10, the block the BLK20, the block BLK30, the block BLK40, the block BLK50, . . . , the block BLK100 in this case).

Each region in the write destination block management table 34 stores metadata regarding the write destination block corresponding to this region. For example, the metadata of the region corresponding to the write destination block BLK10 includes the second counter value indicating the number of uncompleted read commands for the un-readable region of the write destination block BLK10 and a write buffer address list indicating a list of buffer addresses which store write data to be written in the un-readable region of the write destination block BLK10. Similarly, the metadata of the region corresponding to the write destination block BLK100 includes the second counter value indicating the number of uncompleted read commands for the un-readable region of the write destination block BLK100 and a write buffer address list indicating a list of buffer addresses which store write data to be written in the un-readable region of the write destination block BLK100.

The write buffer address list corresponding to a certain write destination block is buffer management information indicating a correspondence between the respective physical addresses of the un-readable region in this write destination block and the locations in the buffer that stores data being written to this write destination block or data waiting for being written to this write destination block.

The block/buffer control unit 23 uses a plurality of second counter values corresponding to the block BLK10, the block BLK20, the block BLK30, the block BLK40, the block BLK50, . . . , and the block BLK100 to manage the presence or absence of the uncompleted read commands respectively for the un-readable regions of the block BLK10, the block BLK20, the block BLK30, the block BLK40, the block BLK50, . . . , and the block BLK100, respectively.

The controller 4 increments the second counter value corresponding to the block BLK10, for example, by one, each time a read command for the un-readable region of the block BLK10 is received, and decrements the second counter value corresponding to the block BLK10, for example, by one, each time the read command for the un-readable region of the block BLK10 is completed.

Similarly, the controller 4 increments the second counter value corresponding to the block BLK100, for example, by one, each time a read command for the un-readable region of the block BLK100 is received, and decrements the second counter value corresponding to the block BLK100, for example, by one, each time the read command for the un-readable region of the block BLK100 is completed.

When the read target block having the block address allocated to the logical address specified by the read command (that is, the logical address of the read target data specified by the read command) is the write destination block and it is not possible to read the read target data from this write destination block, the controller 4 refers to the buffer address list corresponding to this write destination block to obtain the location (buffer address) in the buffer that stores the read target data. The controller 4 then reads the read target data from the acquired location in the buffer.

Thus, instead of retrieving desired data from the entire buffer based on the logical address specified by the read command, only a small table (buffer address list) associated with the specific read target block having a block address allocated to this logical address (a specific write destination block in this case) is referred to, so that the location (buffer address) in the buffer that stores the read target data can be efficiently acquired.

FIG. 9 illustrates an example of the write buffer address list in the write destination block management table 34.

In FIG. 9, a write buffer address list corresponding to the write destination block BLK10 is illustrated In the region in the write destination block management table 34 corresponding to the write destination block BLK10, each buffer address containing write data to be written to an un-readable region of the write destination block BLK10 is stored. Each buffer address indicates a region in the buffer 32 in the DRAM 6 or a region in the write buffer 51 in the host memory. For write data that has already been transferred from the write buffer 51 in the host memory to the buffer 32 in the DRAM 6, the buffer address of this write data indicates a region in the buffer 32 in the DRAM 6. For write data that is not yet transferred from the write buffer 51 in the host memory to the buffer 32 in the DRAM 6, the buffer address of this write data indicates a region in the write buffer 51 in the host memory.

In the region in the write destination block management table 34 corresponding to the write destination block BLK10, each buffer address is associated with a corresponding physical address (PBA) in the un-readable region of the write destination block BLK10. For example, for write data to be written to the page i+1 being written, the buffer address of this write data is associated with a physical address (PBA) indicating the page i+1. Further, as for the write data to be written to the page j being written, the buffer address of this write data is associated with a physical address (PBA) indicating the page j.

Note that when the unwritten region (for example, page j+1) of the write destination block BLK10 is allocated to the logical address of the write data associated with the write command already received from the host 2 as the write destination physical address, the buffer address of this write data to be written to page j+1 may also be included in this write buffer address list.

When the physical address corresponding to the logical address of the received read command indicates the readable region (page 0 to page i) of the write destination block BLK10, the first counter value of the write destination block BLK10 is incremented for example, by one. When the physical address corresponding to the logical address of the received read command indicates the un-readable region (page i+1 to page k) of the write destination block BLK10, the second counter value of the write destination block BLK10 is incremented for example, by one.

Figure 10:
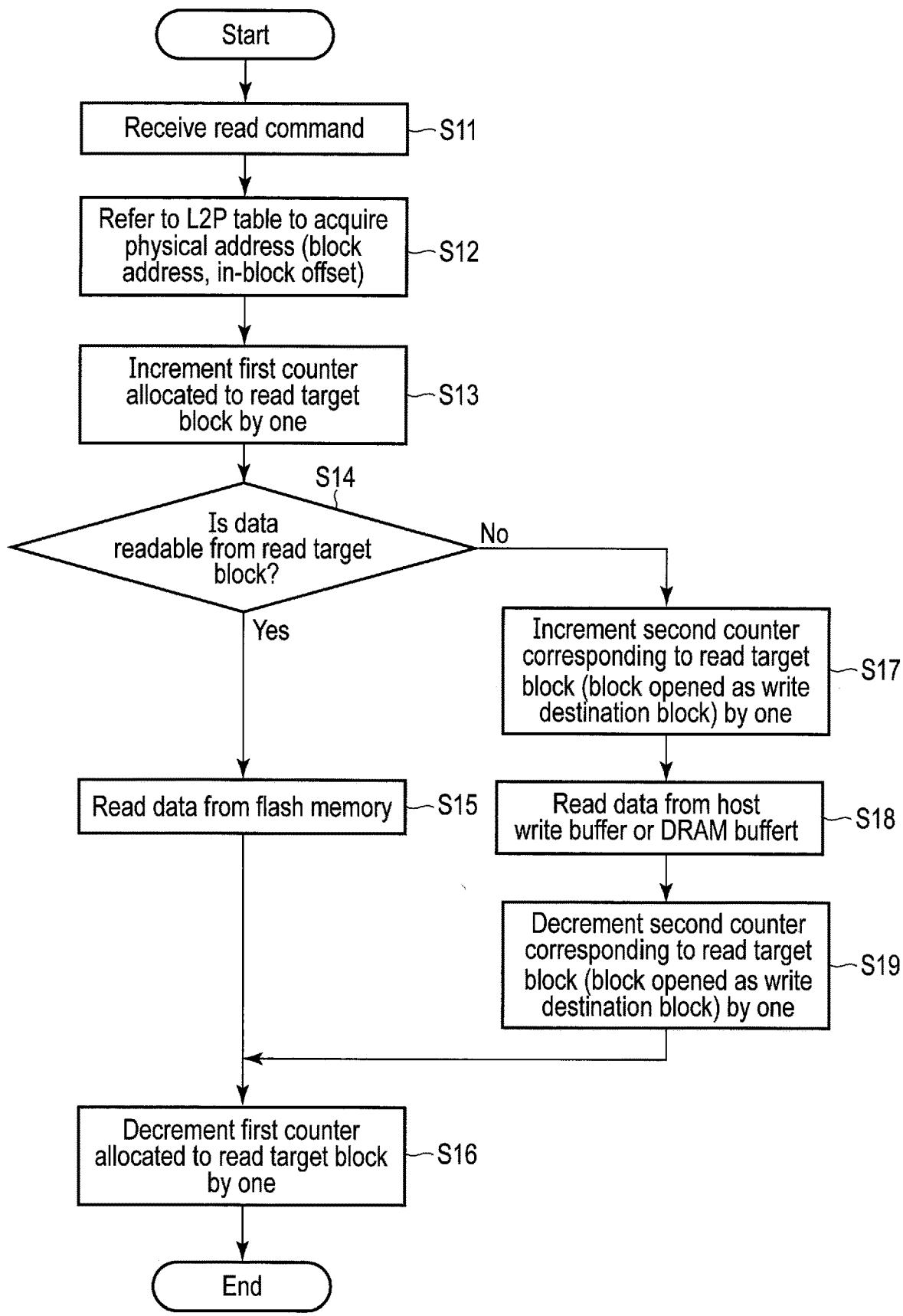
FIG. 10 is a flowchart illustrating a procedure of a reading operation which is executed in the memory system according to the embodiment.

A flowchart in FIG. 10 illustrates a procedure of the reading operation executed in the SSD 3.

The controller 4 receives a read command from the host 2 (Step S11). The controller 4 refers to the L2P table 31 and acquires a physical address (block address, in-block offset) corresponding to the logical address of the read target data specified by the received read command from the L2P table 31 (Step S12). The in-block offset is represented by a page address and an in-page offset. The controller 4 increments the first counter value corresponding to the read target block, for example, by one (Step S13).

The controller 4 determines whether or not the read target data can be read from the read target block having a block address included in the acquired physical address (Step S14). In Step S14, the controller 4 may compare the in-block offset included in the acquired physical address with the URP corresponding to the read target block having the block address included in the acquired physical address.

In this case, when the in-block offset is smaller than URP, the controller 4 can determine that the read target data can be read from the read target block. On the other hand, when the in-block offset is equal to or greater than this URP, the controller 4 can determine that the read target data cannot be read from the read target block, that is, the read target block is the write destination block and the read target physical storage location is the un-readable region in this write destination block.

The controller 4 reads the read target data from the read target block or buffer depending on whether or not the read target data can be read from the read target block, and decrements the first counter value corresponding to the read target block, for example, by one, after the reading of the read target data has been finished.

For example, when the read target data can be read from the read target block (YES in Step S14), the controller 4 reads the read target data from the read target physical storage location in the read target block indicated by the acquired physical address, and returns the read data to the host 2 (Step S15). The controller 4 then decrements the first counter value corresponding to the read target block, for example, by one (Step S16).

On the other hand, when the read target data is not readable from the read target block (NO in Step S14), that is, when this read target block is the write destination block and the read target data is not readable from the read target block, the controller 4 increments the second counter value corresponding to this read target block (write destination block), for example, by one (Step S17).

The controller 4 acquires the buffer address associated with the acquired in-block offset from the write buffer address list corresponding to the read target block (write destination block), and based on the acquired buffer address, reads the read target data from the buffer (the write buffer 51 in the host memory or the buffer 32 in the DRAM 6), and returns the read data to the host 2 (Step 318). The controller 4 decrements the second counter value corresponding to the read target block (i.e., write destination block), for example, by one (Step S19). The controller 4 then decrements the first counter value corresponding to the read target block, for example, by one (Step S16).

Figure 11:
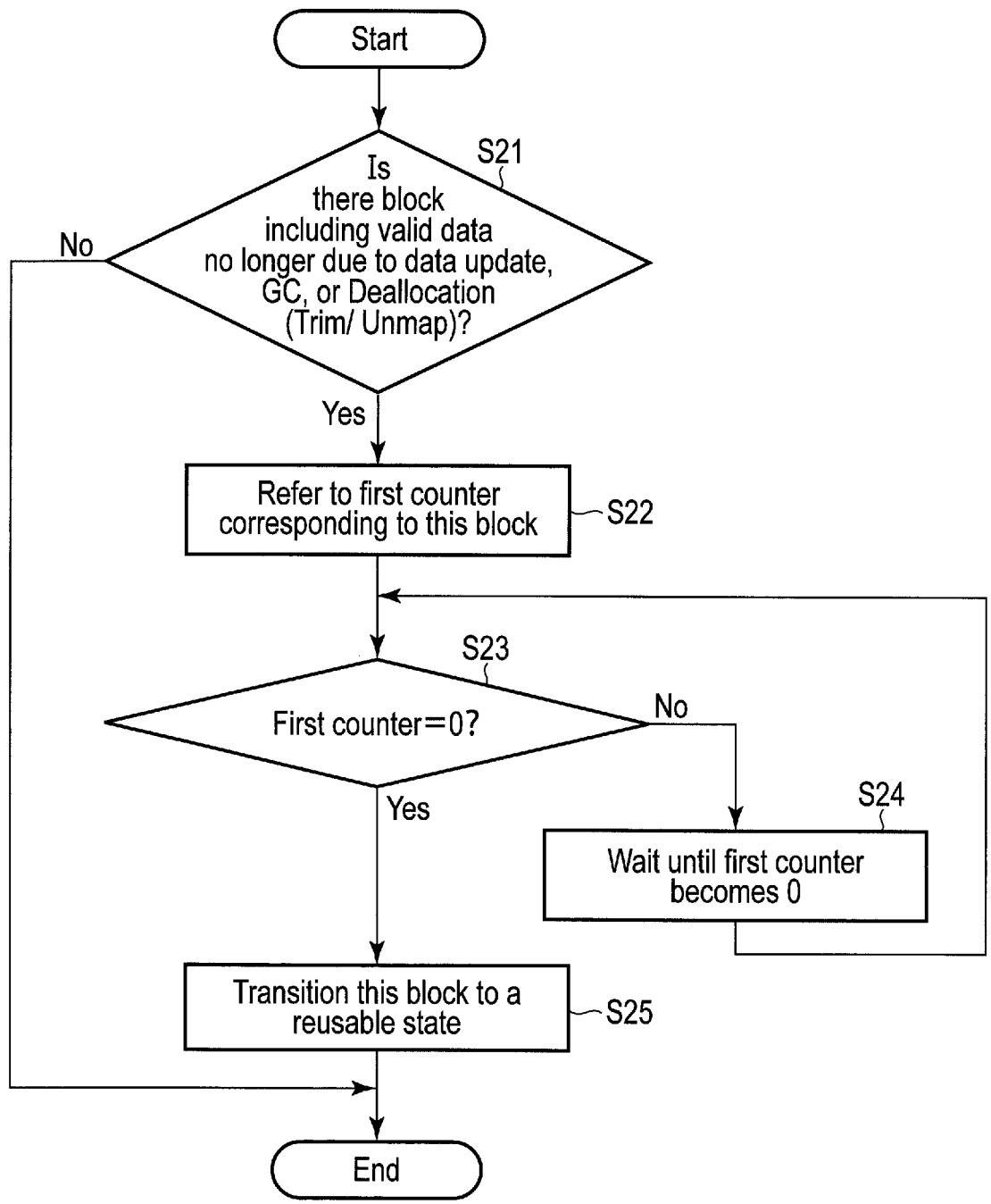
FIG. 11 is a flowchart illustrating a procedure of block reuse processing which is executed in the memory system according to the embodiment.

The flowchart in FIG. 11 illustrates a procedure of block reuse processing executed in the SSD 3.

The controller 4 determines whether or not there is a block including valid data no longer due to data update, GC, or deallocation (trim/unmap) (Step S21). When there is a block including valid data no longer, that is, when there is no more valid data left in a certain block (YES in Step S21), the controller 4 refers to the first counter value corresponding to this block (Step S22).

When the first counter value corresponding to this block is zero (YES in Step S23), the controller 4 transitions this block to a state reusable as a new write destination block (Step S25). In Step S25, the controller 4 may execute processing for deleting the block address of this block from the list of active blocks and then adding the deleted block address to the list of free blocks in order to transition this block to a state reusable as a new write destination block.

When the first counter value corresponding to this block is not zero (NO in Step S23), that is, the first counter value corresponding to this block is equal to or greater than one, the controller 4 waits until the first counter value becomes zero (Step S24). When the first counter value becomes zero (YES in Step S23), the controller 4 transitions this block to a state reusable as a new write destination block (Step S25).

Figure 12:
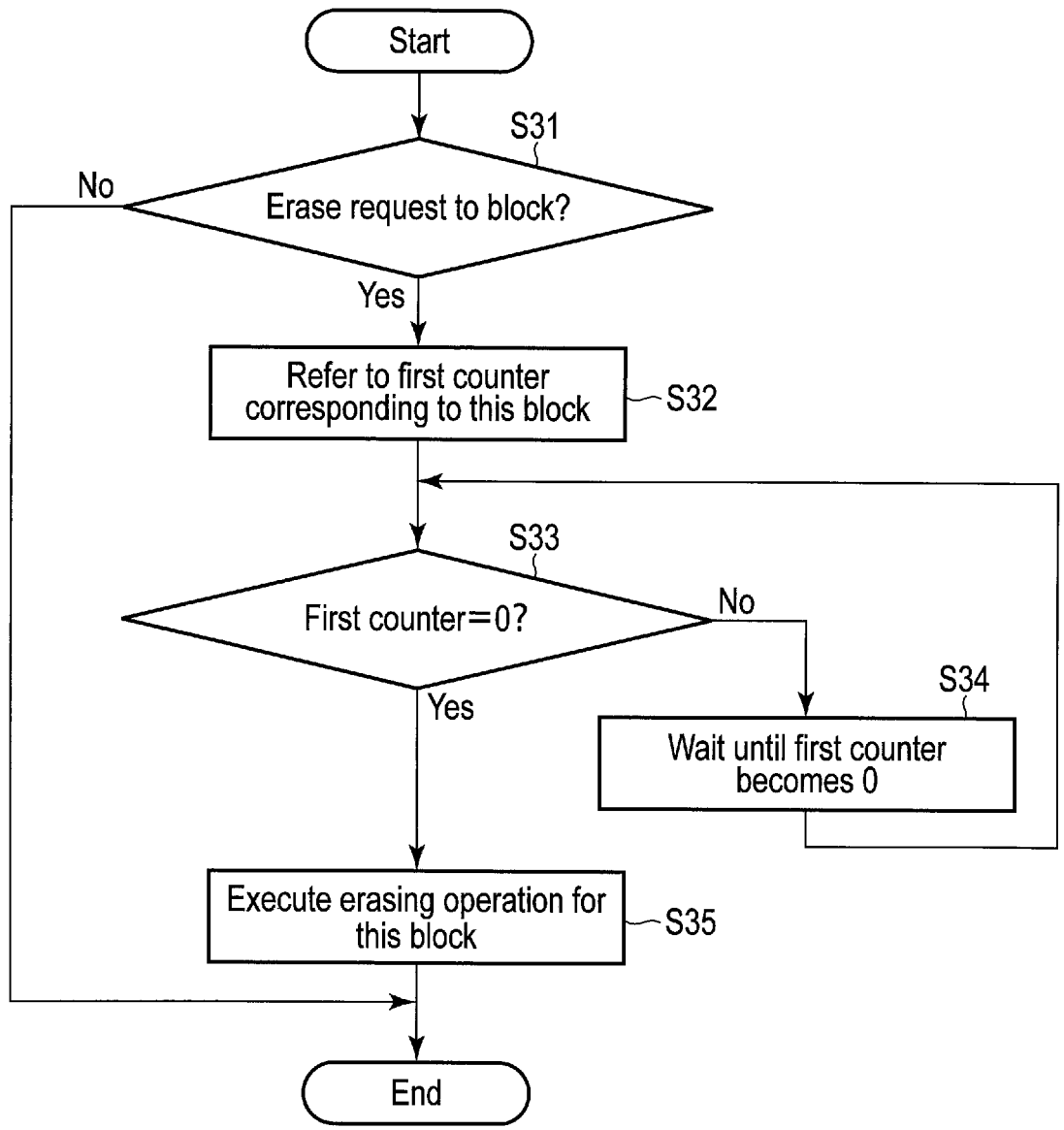
FIG. 12 is a flowchart illustrating a procedure of block erase processing which is executed in the memory system according to the embodiment.

The flowchart in FIG. 12 illustrates a procedure of block erase processing executed in the SSD 3.

Examples of the processing for transitioning a state of a certain block to a state reusable as a new write destination block include processing for adding this block to a list of free blocks as well as executing an erasing operation on this block. An erasing operation on a block may be executed by being triggered by a fact that there is no more valid data left in this block. Alternatively, an erasing operation for this block may be executed immediately before allocating a block selected from the free block list as a write destination block. FIG. 12 illustrates a procedure of the block erase processing corresponding to the latter case.

When a request for an erasing operation for a certain block occurs (Step S31), the controller 4 refers to the first counter value corresponding to this block (Step 332). When the first counter value corresponding to this block is zero (YES in Step S33), the controller 4 executes the erasing operation for this block (Step S35).

When the first counter value corresponding to this block is not zero (NO in Step S33), that is, the first counter value corresponding to this block is equal to or greater than one, the controller 4 waits until the first counter value becomes zero (Step S34) When the first counter value becomes zero (YES in Step S33), the controller 4 executes the erasing operation for this block (Step S35).

Figure 13:
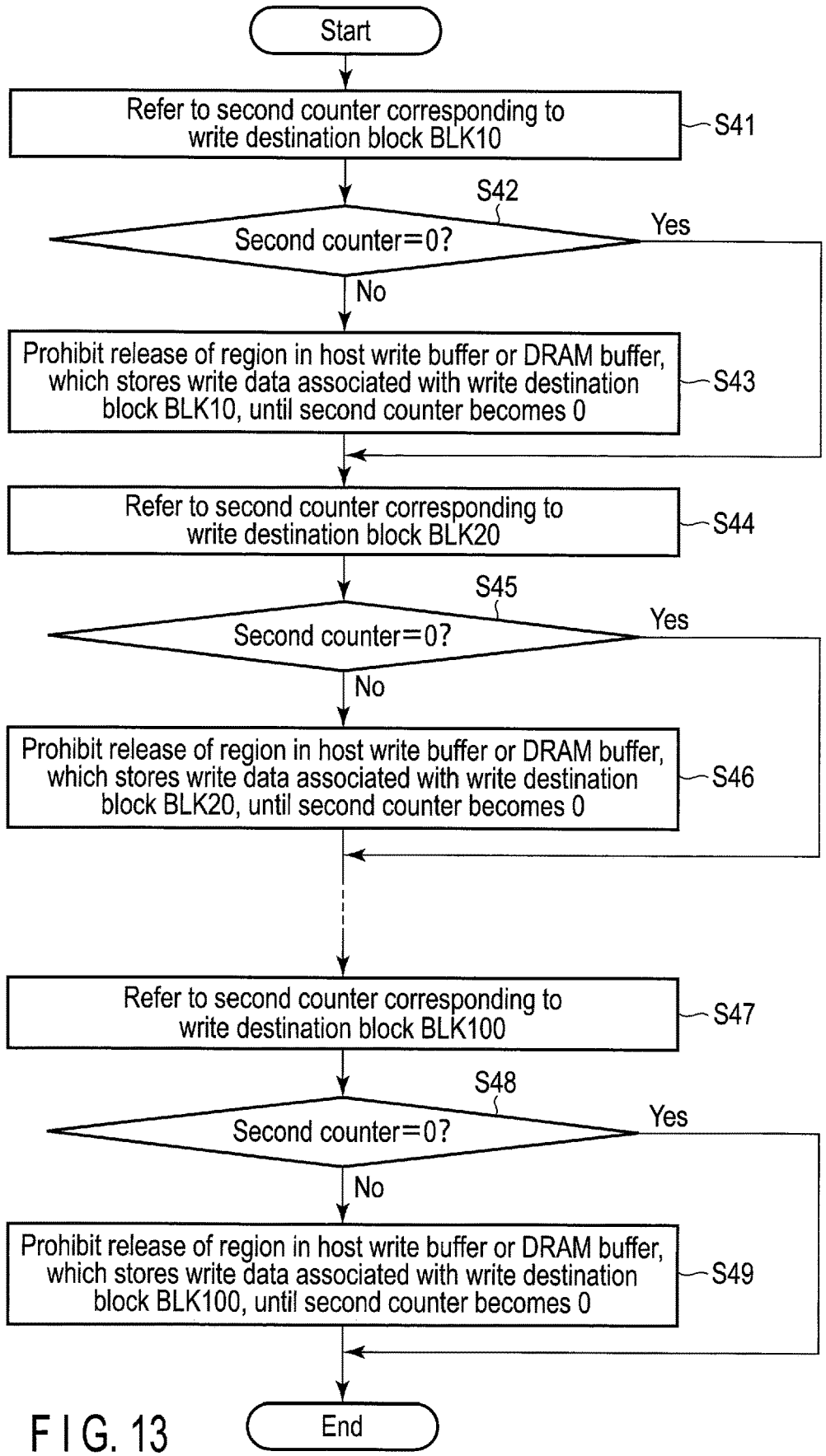
FIG. 13 is a flowchart illustrating a procedure of buffer release control processing which is executed in the memory system according to the embodiment.

FIG. 13 illustrates a procedure of buffer release control processing executed in the SSD 3.

It is now assumed that data is written to each of the write destination blocks by the progress of data writing to each of the write destination blocks BLK10, BLK20, . . . , BLK100.

For example, when the operation of writing certain data to the write destination block BLK10 is completed, it is no longer necessary to store this data in the buffer (the write buffer 51 in the host memory or the buffer 32 in the DRAM 6). In this case, the controller 4 refers to the second counter value corresponding to the write destination block BLK10 (Step S41), and determines whether or not the second counter value is zero (Step S42). When the second counter value is not zero (NO in Step S42), the controller 4 prohibits release of the region in the buffer (the write buffer 51 in the host memory or the buffer 32 in the DRAM 6), that stores write data associated with the write destination block BLK10 (write data associated with a stream having a stream ID #1), until the second counter value becomes zero (Step S43). In Step S43, for example, the controller 4 may make execution of the processing of returning a response indicating completion of the write command including the stream ID #1 to the host 2 wait until the second counter value becomes zero, thereby prohibiting the release of a region in the write buffer 51 in the host memory that stores the write data associated with the stream having the stream ID #1 until the second counter value becomes zero.

Further, for example, when the operation of writing certain data to the write destination block BLK20 is completed, it is no longer necessary to store this data in the buffer (the write buffer 51 in the host memory or the buffer 32 in the DRAM 6). In this case, the controller 4 refers to the second counter value corresponding to the write destination block BLK20 (Step S44), and determines whether or not the second counter value is zero (Step S45). When the second counter value is not zero (NO in Step S45), the controller 4 prohibits release of the region in the buffer (the write buffer 51 in the host memory or the buffer 32 in the DRAM 6), which stores write data associated with the write destination block BLK20 (write data associated with a stream having a stream ID #2), until the second counter value becomes zero (Step S46). In Step S46, for example, the controller 4 may make execution of the processing of returning a response indicating completion of the write command including the stream ID #2 to the host 2 wait until the second counter value becomes zero, thereby prohibiting the release of the region in the write buffer 51 in the host memory that stores the write data associated with the stream of the stream ID #2 until the second counter value becomes zero.

Further, for example, when the operation of writing certain data to the write destination block BLK100 is completed, it is no longer necessary to store this data in the buffer (the write buffer 51 in the host memory or the buffer 32 in the DRAM 6). In this case, the controller 4 refers to the second counter value corresponding to the write destination block BLK100 (Step S47), and determines whether or not the second counter value is zero (Step S48). When the second counter value is not zero (NO in Step S48), the controller 4 prohibits release of the region in the buffer (the write buffer 51 in the host memory or the buffer 32 in the DRAM 6), that stores write data associated with the write destination block BLK100 (write data associated with a stream having a stream ID #n), until the second counter value becomes zero (Step S49). In Step S49, for example, the controller 4 may make execution of the processing of returning a response indicating completion of the write command including the stream ID #n to the host 2 wait until the second counter value becomes zero, thereby prohibiting the release of a region in the write buffer 51 in the host memory that stores the write data associated with the stream having the stream ID #n until the second counter value becomes zero.

Note that when the writing operation for a certain write destination block does not proceed, the region in the buffer that stores the write data to be written to this write destination block is not released. Therefore, the controller 4 may prohibit writing of data to this write destination block until there is no more uncompleted read command to the unreadable region of a certain write destination block (until the second counter value corresponding to this write destination block becomes zero), thereby prohibiting the release of a region in the buffer that stores write data to be written to this write destination block.

In this case, as illustrated in the flowchart of FIG. 14, the controller 4 refers to the second counter value corresponding to the write destination block BLK10 (Step S51), and determines whether or not the second counter value is zero (Step S52). When the second counter value is not zero (NO in Step S52), the controller 4 prohibits an operation for writing write data associated with the write destination block BLK10 (write data associated with the stream having the stream ID #1) to the write destination block BLK10 until the second counter value becomes zero (Step S53).

The controller 4 refers to the second counter value corresponding to the write destination block BLK20 (Step S54), and determines whether or not the second counter value is zero (Step S55). When the second counter value is not zero (NO in Step S55), the controller 4 prohibits an operation for writing write data associated with the write destination block BLK20 (write data associated with the stream having the stream ID #2) to the write destination block BLK20 until the second counter value becomes zero (Step S56).

The controller 4 refers to the second counter value corresponding to the write destination block BLK100 (Step S57), and determines whether or not the second counter value is zero (Step S58). When the second counter value is not zero (NO in Step S58), the controller 4 prohibits an operation for writing write data associated with the write destination block BLK100 (write data associated with the stream having the stream ID #n) to the write destination block BLK100 until the second counter value becomes zero (Step S59).

FIG. 15 illustrates a stream writing operation which is used for writing a plurality of types of write data associated with a plurality of streams to a plurality of write destination blocks corresponding to the streams, respectively.

FIG. 15 illustrates a case where the write destination block BLK10 is associated with the stream having the stream ID #1, the write destination block BLK20 is associated with the stream having the stream ID #2, the write destination block BLK30 is associated with the stream having a stream ID #3, the write destination block BLK40 is associated with the stream having a stream ID #4, the write destination block BLK50 is associated with the stream having the stream ID #5, the write destination block BLK60 is associated with the stream having the stream ID #6, and the write destination block BLK100 is associated with the stream having the stream ID #n.

For example, the I/O service (virtual machine #1) corresponding to an end user #1 issues write commands each including the stream ID #1, the I/O service (virtual machine #2) corresponding to an end user #2 issues write commands each including the stream ID #2, and the I/O service (virtual machine #n) corresponding to an end user #n issues write commands each including the stream ID #n.

Write data associated with the write command including the stream ID #1 is written to the write destination block BLK10, write data associated with the write command including the stream ID #2 is written to the write destination block BLK20, and write data associated with the write command including the stream ID #n is written in the write destination block BLK100.

FIG. 16 illustrates an operation for allocating a plurality of write destination blocks corresponding to the plurality of streams from a group of free blocks.

In FIG. 16, for the sake of simplicity, only two streams; the stream with the stream ID #1 (stream #1) and the stream with the stream ID #2 (stream #2) are illustrated.

The state of each block in the NAND flash memory 5 is roughly divided into active blocks that store valid data and free blocks that do not store valid data. Each block that is the active block is managed by a list called an active block pool. On the other hand, each block which is a free block is managed by a list called a free block pool. The active block pool 101-1 is a list of blocks each storing valid data associated with the stream #1. The active block pool 101-n is a list of blocks each storing valid data associated with the stream #n. The free block pool 200 is a list of all free blocks. These free blocks are shared by the plurality of streams.

When the controller 4 receives a write command including the stream ID #1, the controller 4 determines whether or not a write destination block (open block) for the stream #1 has been allocated.

When the write destination block for the stream #1 has not been allocated, the controller 4 allocates one free block in the free block pool 200 as the write destination block for the stream #1. FIG. 16 illustrates a case where the block BLK10 is allocated as a write destination block for the stream #1. The controller 4 writes write data associated with each write command including the stream ID #1 to the block BLK10. When the write destination block for the stream #1 has already been allocated, the controller 4 does not need to execute the operation of allocating the free block as the write destination block for the stream #1.

When the entire write destination block (BLK10 in this case) for the stream #1 is filled with the write data from the host 2, the controller 4 manages this write destination block BLK10 with the active block pool 101-1 (closed), and allocates a free block in the free block pool 200 as a new write destination block (open block) for the stream #1.

When all valid data in a certain block in the active block pool 101-1 is invalidated due to data update, deallocation (unmap, trim), garbage collection, and the like, the controller 4 moves this block to a free block pool 200 to transition this block to a state reusable as the write destination block.

When the controller 4 receives a write command including the stream ID #n, the controller 4 determines whether or not a write destination block (open block) for the stream #n has been allocated.

When the write destination block for the stream #n has not been allocated, the controller 4 allocates one free block in the free block pool 200 as the write destination block for the stream #n. FIG. 16 illustrates a case where the block BLK100 is allocated as a write destination block for the stream #n. The controller 4 writes write data associated with each write command including the stream ID #n to the block BLK100. When the write destination block for the stream #n has already been allocated, the controller 4 does not need to execute the operation of allocating the free block as the write destination block for the stream #n.

When the entire write destination block (BLK100 in this case) for the stream #n is filled with the write data from the host 2, the controller 4 manages this write destination block BLK100 with the active block pool 101-n (closed), and allocates a free block in the free block pool 200 as a new write destination block (open block) for the stream #n.

When all valid data in a certain block in the active block pool 101-n is invalidated due to data update, deallocation (unmap, trim), garbage collection, and the like, the controller 4 moves this block to a free block pool 200 to transition this block to a state reusable as the write destination block.

Figure 17:
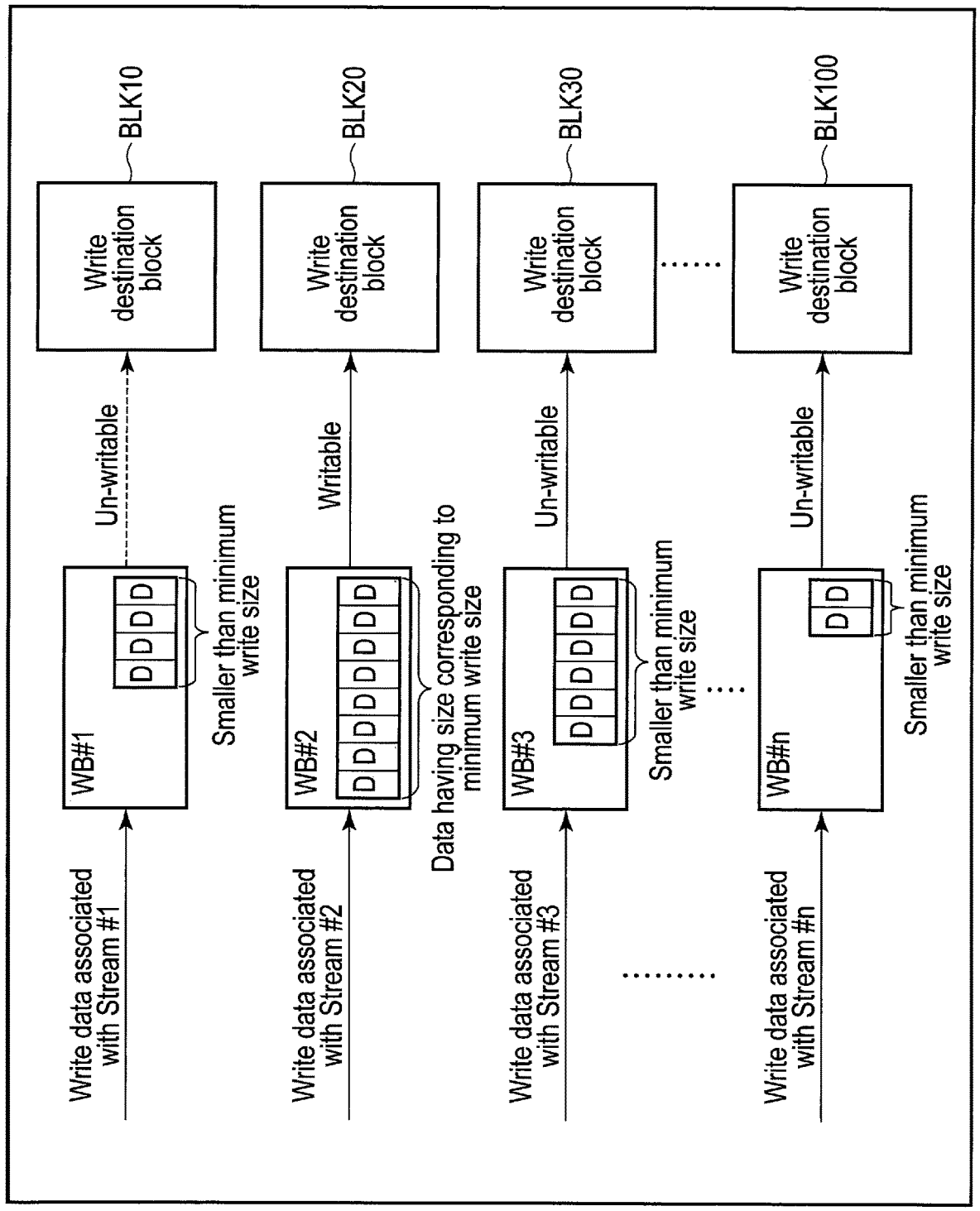
FIG. 17 is a block diagram illustrating a writing operation executed using a plurality of buffer regions corresponding to the plurality of streams.

FIG. 17 illustrates a writing operation executed using a plurality of buffer regions corresponding to a plurality of streams.

In FIG. 17, a write buffer region WB #1, a write buffer region WB #2, a write buffer region WB #3, ..., a write buffer region WB #n corresponding to the stream #1, the stream #2, the stream #3, ..., and the stream #n are prepared as the first buffer in the SSD 3.

Write data associated with each write command including the stream ID #1 is transferred from the write buffer 51 in the memory of the host 2 to the write buffer region WB #1, and stored in the write buffer region WB #1. When the total size of the write data accumulated in the write buffer region WB #1 reaches the minimum write size of the NAND flash memory 5, these write data are written into the write destination block BLK10.

The minimum write size of the NAND flash memory 5 may be the page size, that is, the size of one page (for example, 16 Kbytes). Alternatively, in the case where a NAND flash memory chip including two planes is used as the NAND flash memory 5, writing operations for two blocks respectively selected from the two planes may be executed in parallel. In this case, twice the page size (for example, 32 Kbytes) may be used as the minimum write size of the NAND flash memory 5.

The minimum length (i.e., minimum size) of the write data specified by each write command is, for example, 4 Kbytes (or 512 bytes). Therefore, the minimum write size of the NAND flash memory 5 is larger than the minimum size of the write data specified by each write command.

Write data associated with each write command including the stream ID #2 is transferred from the write buffer 51 in the memory of the host 2 to the write buffer region WB #2, and is stored in the write buffer region WB #2. When the total size of the write data accumulated in the write buffer region WB #2 reaches the minimum write size of the NAND flash memory 5, these write data are written into the write destination block BLK20.

Write data associated with each write command including the stream ID #3 is transferred from the write buffer 51 in the memory of the host 2 to the write buffer region WB #3, and is stored in the write buffer region WB #3. When the total size of the write data accumulated in the write buffer region WB #3 reaches the minimum write size of the NAND flash memory 5, these write data are written into the write destination block BLK30.

Similarly, write data associated with each write command including the stream ID #n is transferred from the write buffer 51 in the memory of the host 2 to the write buffer region WB #n, and is stored in the write buffer region WB #n. When the total size of the write data accumulated in the write buffer region WB #n reaches the minimum write size of the NAND flash memory 5, these write data are written into the write destination block BLK100.

In a configuration illustrated in FIG. 17, a case where large sized write buffers including the write buffer region WB #1, the write buffer region WB #2, the write buffer region WB #3, ..., the write buffer region WB #n corresponding to the stream #1, the stream #2, the stream #3, ..., the stream #n are provided in the SSD 3 has been described.

FIG. 18 illustrates an example of a writing operation for reducing the write buffer size that needs to be provided in the SSD 3.

Each time that the controller 4 of the SSD 3 receives a write command from the host 2, the controller 4 stores only this write command in a command queue 41. That is, the controller 4 stores each received write command in one of the command queues 41-1 to 41-n corresponding to the streams #1 to #n to classify each received write command into n groups corresponding to the streams #1 to #n.

In this case, each write command including the stream ID #1 is stored in the command queue 41-1, each write command including the stream ID #2 is stored in the command queue 41-2, each write command including the stream ID #3 is stored in the command queue 41-3, and each write command including the stream ID #n is stored in the command queue 41-n.

The controller 4 calculates the sum of the lengths (data sizes) specified by write commands belonging to the same group to determine whether or not the length of the write data associated with a set of write commands belonging to the same group reaches the minimum write size.

For example, for the group corresponding to the stream #1, the controller 4 calculates the sum of the lengths included in write commands stored in the command queue 41-1. When the sum of the lengths included in write commands stored in the command queue 41-1 reaches the minimum write size, the controller 4 determines that the length of the write data associated with the set of the write commands belonging to the group corresponding to the stream #1 reaches the minimum write size.

Similarly, for the group corresponding to stream #2, the controller 4 calculates the sum of the lengths included in write commands stored in the command queue 41-2. When the sum of the lengths included in write commands stored in the command queue 41-2 reaches the minimum write size, the controller 4 determines that the length of the write data associated with the set of the write commands belonging to the group corresponding to the stream #2 reaches the minimum write size.

When the length of the write data associated with a set of write commands belonging to a certain group reaches the minimum write size, for example, when the sum of the lengths specified by write commands belonging to the group corresponding to the stream #2 reaches the minimum write size, the controller 4 transfers the write data corresponding to the minimum write size associated with the stream #2 from the write buffer 51 in the host memory to the internal buffer 16 based on the data pointer and the length included in each of these write commands. The controller 4 then writes the write data transferred to the internal buffer 16 to the write destination block BLK20 corresponding to the stream #2. When the write data is written to the write destination block BLK20, this write data in the internal buffer 16 is no longer necessary.

Therefore, for example, when the sum of the lengths included in the write commands stored in the command queue 41-3 reaches the minimum write size for the next time, the controller 4 can transfer the write data corresponding to the minimum write size associated with the set of the write command belonging to the group corresponding to the stream #3 from the write buffer 51 in the host memory to the internal buffer 16, and can write this write data transferred to the internal buffer 16 to the write destination block BLK30 corresponding to the stream #3.

As described above, in the writing operation illustrated in FIG. 18, the controller 4 checks the length (size) of the write data corresponding to the received write command group for each of the streams and detects the stream in which the size of the write data has reached the minimum write size of the NAND flash memory 5. Then, write data corresponding to the minimum write size associated with the stream in which the write data size has reached the minimum write size is transferred from the write buffer 51 in the host memory to the internal buffer 16. The write data corresponding to the minimum write size transferred to the internal buffer 16 can be started to be written immediately. Therefore, the internal buffer 16 can be shared by a plurality of streams. Therefore, in a case where the writing operation of FIG. 18 is used, even when the number of streams to be supported by SSD 3 increases, the stream writing operation can be executed efficiently by preparing only the internal buffer 16 corresponding to the minimum write size.

FIG. 19 illustrates a configuration example of each of the host 2 and the SSD 3 regarding data writing.

It is now assumed that the writing operation of FIG. 18 is used.

In the host 2, each write command is stored in the submission queue 71. Each write command includes an LBA of write data, the length of the write data, the stream ID, and the data pointer indicating a location in the write buffer 51 that stores the write data. A response indicating completion of each write command is stored in the completion queue 72.

The write data associated with each write command is stored in a write buffer 51 in the host memory. In the write buffer 51, a plurality of regions corresponding to the stream #1 to the stream #n may be allocated. In this case, the write data associated with the stream #1 is stored in a region in the write buffer 51 corresponding to the stream #1, the write data associated with the stream #2 is stored in a region in the write buffer 51 corresponding to the stream #2, and the write data associated with the stream #n is stored in a region in the write buffer 51 corresponding to the stream #n.

In the SSD 3, the write control unit 21 receives write commands from the submission queue 71 of the host 2, and stores each of the received write commands in one of the command queues 41-1 to 41-n to classify the received write commands into a plurality of groups corresponding to the streams #1 to #n. Each write command including the stream ID #1 is stored in the command queue 41-1, each write command including the stream ID #2 is stored in the command queue 41-2, and each write command including the stream ID #n is stored in the command queue 41-n.

The write control unit 21 executes an address allocating operation for allocating a physical address (PBA) in the NAND flash memory 5 to the write data associated with each received write command. The physical address (PBA) indicates a storage location in the NAND flash memory 5 to which the write data associated with each received write command is to be written. The physical address may be represented by a block address, a page address, and an in-page offset. In each command queue, the LBA, the length, the PBA, and the buffer address may be managed for each write command. The PBA indicates a physical address (block address, page address, intra-page offset) allocated to the write data associated with this write command. The buffer address indicates the location in the write buffer 51 of the host memory that stores the write data associated with this write command. The location in the write buffer 51 is specified by a data pointer included in this write command.

In a case where write data associated with a certain write command is transferred from the write buffer 51 of the host memory to the buffer 32 of the DRAM 6 (hereinafter referred to as the DRAM buffer 32), the value of the buffer address corresponding to the write command is updated to a value indicating the location in the DRAM buffer 32 that stores this write data. For example, it is also possible that the write data associated with a write command after an elapse of a predetermined time from reception of the write command may be transferred from the write buffer 51 of the host memory to the DRAM buffer 32.

In the DRAM buffer 32, a plurality of regions corresponding to the plurality of streams #1 to #n are allocated. In this case, the write data associated with the stream #1 is transferred to a region in the DRAM buffer 32 corresponding to the stream #1, the write data associated with the stream #2 is transferred to a region in the DRAM buffer 32 corresponding to the stream #2, and the write data associated with the stream #n is transferred to a region in the DRAM buffer 32 corresponding to the stream #n.

When the length of the write data associated with the set of write commands belonging to the group corresponding to a certain stream reaches the minimum write size, the write control unit 21 sends, to the DMAC 15, a transfer request for transferring the write data, which has the length (size) corresponding to the minimum write size and is associated with this stream, from the write buffer 51 in the host memory to the internal buffer 16. In response to the reception of this transfer request, the DMAC 15 executes the DMA transfer to transfer the write data which has the size corresponding to the minimum write size and is associated with this stream from the write buffer 51 in the host memory to the internal buffer 16. The write control unit 21 then sends a program instruction to the NAND interface 13 and writes the write data having the size corresponding to the minimum write size transferred to the internal buffer 16 to the write destination block in the NAND flash memory 5.

Basically, after completion of writing of the write data to the write destination block, the write control unit 21 returns a response indicating completion of each of the write commands corresponding to this write data to the host 2. A response indicating completion of each write command is placed in a completion queue 72 as a buffer release request for permitting the host 2 to release the corresponding write data. Since the response indicating completion includes an identifier of the completed write command, the host 2 can release a region in the write buffer 51 that stores the write data associated with the completed write command specified by the response indicating completion.

Further, after completion of the transfer of the write data having the size corresponding to the minimum write size to the internal buffer 16, the write control unit 21 may delete each of the write commands corresponding to this write data from the command queue.

Further, as described above, when a predetermined time has elapsed since the reception of a certain write command belonging to a group corresponding to a certain stream, even though the length of the write data associated with the set of the write command belonging to the group corresponding to this stream does not reach the minimum write size, the write control unit 21 transfers only write data associated with this write command from the write buffer 51 in the host memory to the DRAM buffer 32 as a write data for this stream by using the DMAC 15, and returns a response indicating completion of this write command to the host 2.

For example, when the size of the write data associated with the set of write commands stored in the command queue 41-1 does not reach the minimum write size even after an elapse of a predetermined time from the reception of a certain write command containing the stream ID #1, that is, when the time during which the certain write command is kept in the command queue 41-1 reaches the predetermined time, the write control unit 21 transfers only the write data associated with this write command from the write buffer 51 in the host memory to the DRAM buffer 32 in order to prevent an occurrence of a timeout error of this write command. In this case, this write data may be transferred to the region for the stream #1 in the DRAM buffer 32. This write command is deleted from the command queue 41-1.

In a period when a large amount of data writing is requested from the host 2, that is, in a period in which a large number of write commands of each stream received from the host 2, there is a high possibility that the length of the write data associated with the set of write commands belonging to the group corresponding to each stream reaches the minimum write size before the predetermined time elapses from reception of each write command. Therefore, most of the write data is transferred to the internal buffer 16 instead of the DRAM buffer 32. The case where the time during which a certain write command is held in the command queue reaches a predetermined time occurs when the number of write commands received from the host 2 is relatively small.

Therefore, traffic between the controller 4 and the DRAM 6 does not increase due to the transfer of write data. Therefore, the bandwidth between the controller 4 and the DRAM 6 can be mainly used for processing for updating the L2P table 31, so that the processing for updating the L2P table 31 can be executed efficiently.

Figure 20:
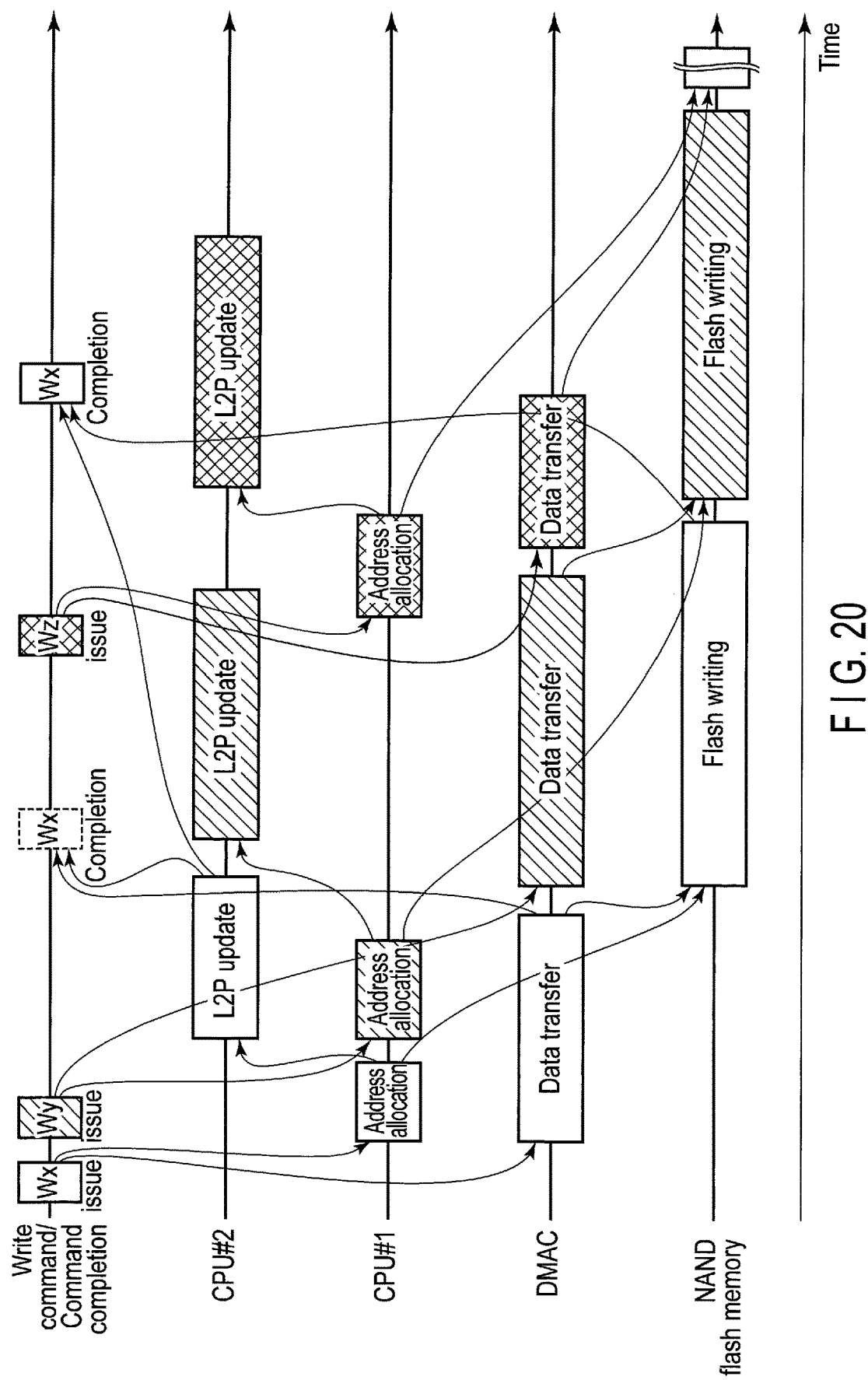
FIG. 20 is a view illustrating a sequence of the writing operation executed in the memory system according to the embodiment.

FIG. 20 illustrates a sequence of writing operations executed in the SSD 3.

When the write command Wx is received from the host 2, the CPU #1 (for example, the CPU 12-1) of the controller 4 determines a physical address (the block address, the page address, and the in-page offset) indicating the physical storage location in the NAND flash memory 5 in which the write data associated with the write command Wx should be stored, and allocates this physical address to this write data (address allocating operation). The CPU #2 (for example, the CPU 12-2) of the controller 4 updates the L2P table 31 such that this physical address is associated with the logical address specified by the write command Wx (L2P update).

When the length of the write data associated with the set of received write commands including the same stream ID as the write command Wx reaches the minimum write size, the DMAC 15 transfers the write data having the size corresponding to the minimum write size from the write buffer 51 of the host memory to the internal buffer 16. The controller 4 then writes the write data stored in the internal buffer 16 to the determined physical storage location in the NAND flash memory 5 (flash writing). After completion of both the L2P update that maps the physical address to the logical address specified by the write command Wx and the flash writing that writes the data associated with the write command Wx to the write destination block, the controller 4 returns a response (completion) indicating completion of the write command Wx to the host 2.

Not that in the case where the write data associated with the write command Wx is transferred to the DRAM buffer 32, the controller 4 returns a response (completion) indicating completion of the write command Wx to the host 2 after completion of both the L2P update and the data transfer.

The write command Wy and the write command Wz are processed in the same manner as the write command Wx.

FIG. 21 illustrates a configuration example of each of the host 2 and the SSD 3 regarding data reading.

When the read control unit 22 receives a read command from the submission queue 71 of the host 2, the read control unit 22 refers to the L2P table 31 in the DRAM 6 to acquire a physical address (the block address, the page address, the in-page offset) indicating the physical storage location in the NAND flash memory 5 allocated to the logical address of the read target data specified by this read command from the L2P table 31.

When this read target data can be read from the NAND flash memory 5, the read control unit 22 sends a read instruction for reading this read target data to the NAND flash memory 5 via the NAND interface 13, and reads this read target data from the NAND flash memory 5. The read target data which has read may be temporarily stored in the internal read buffer 16' in the controller 4. Similarly to the internal buffer 16, the internal read buffer 16' may be realized by a SRAM in the controller 4.

The read control unit 22 uses the DMAC 15 to transfer read target data from the internal read buffer 16' to the read buffer 52 in the host memory. The location in the read buffer 52 where the read target data is to be transferred is specified by the data pointer included in this read command. The read control unit 22 then returns a response indicating completion of this read command to the host 2 and puts the response indicating completion of the read command into the completion queue 72 of the host 2.

When the read target data is not readable from the NAND flash memory 5, that is, when the read target data is data which is not started to be written and is waiting for being written, or is data being written, which has started to be written but cannot be normally read from the NAND flash memory 5, the read control unit 22 reads this read target data from the DRAM buffer 32 or the write buffer 51 in the host memory, and returns the read target data which has read to the host 2. When reading this read target data from the write buffer 51 in the host memory, first, the read control unit 22 uses the DMAC 15 to transfer the read target data from the write buffer 51 to the internal read buffer 16', and uses the DMAC 15 to transfer this read target data from the internal read buffer 16' to the read buffer 52 in the host memory. When reading this read target data from the DRAM buffer 32, the read control unit 22 reads this read target data from the DRAM buffer 32 to the internal read buffer 16', and uses the DMAC 15 to transfer this read target data from the internal read buffer 16' to the read buffer 52 in the host memory.

As described above, with respect to each of the blocks currently used as the write destination blocks, the controller 4 can manage buffer address containing data determined to be written into the write destination block and not being readable, using the write destination block management table 34. The buffer address corresponding to the data, which has been transferred to the DRAM buffer 32 and cannot be read from the NAND flash memory 5, indicates the location in the DRAM buffer 32 containing this data. The buffer address corresponding to the data, which has not been transferred to the DRAM buffer 32 and cannot be read from the NAND flash memory 5, indicates the location in the write buffer 51 in the host memory containing this data. Therefore, the read control unit 22 can read the read target data from the DRAM buffer 32 or the write buffer 51 in the host memory based on the buffer address corresponding to the read target data that cannot be read from the NAND flash memory 5 and returns the read target data that has read to the host 2.

Therefore, the host 2 can receive desired data from the SSD 3 only by performing simple processing for issuing read commands respectively toward the SSD 3 even without performing processing for selectively issuing a read request toward the write buffer 51 and a read command toward the SSD 3.

Figure 22:
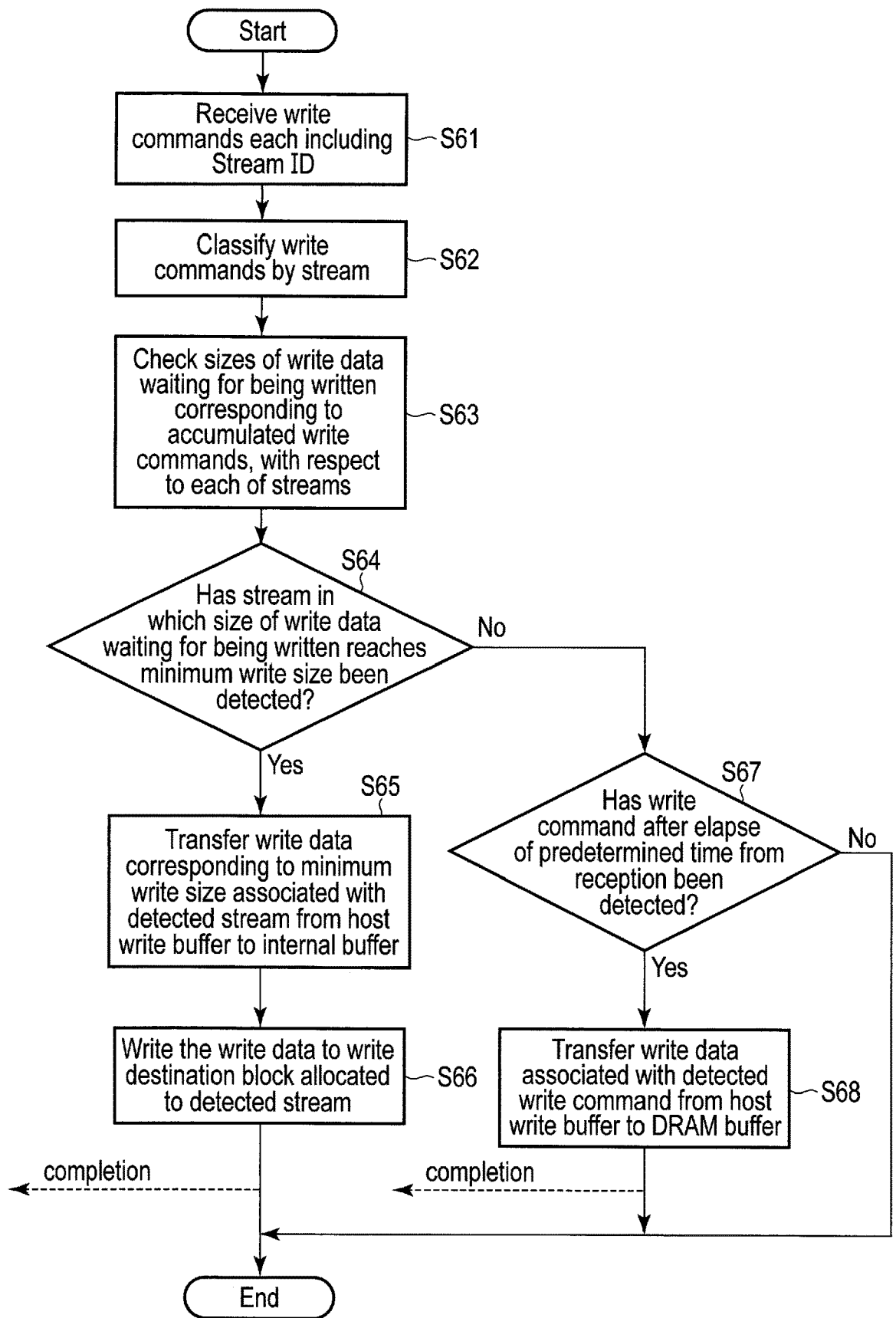
FIG. 22 is a flowchart illustrating a procedure of the writing operation which is executed in the memory system according to the embodiment.

A flowchart in FIG. 22 illustrates a procedure of the writing operation executed in the SSD 3.

The controller 4 receives write commands each including a stream ID from the host 2 (Step S61). The controller 4 classifies received write commands for each stream (Step S62). In Step S62, the controller 4 classifies received write commands into a plurality of groups corresponding to the streams #1 to #n, by storing each of received write commands in one of the command queues 41-1 to 41-n. Accordingly, write commands each including the stream ID #1 are accumulated in the command queue 41-1, write commands each including the stream ID #2 are accumulated in the command queue 41-2, and write commands each including the stream ID #n are accumulated in the command queue 41-n.

The controller 4 checks the size of the write data waiting for being written corresponding to the accumulated write commands for each of the streams and detects the stream in which the size of the write data waiting for being written has reached the minimum write size of the NAND flash memory 5 (Step S63). That is, in Step S63, for each of the plurality of groups, the controller 4 calculates the sum of the lengths specified by write commands belonging to the same group to determine whether or not the length of the write data (the size of the write data waiting for being written) associated with a set of write commands belonging to the same group reaches the minimum write size.

When a stream in which the size of write data waiting for being written has reached the minimum write size is detected (YES in Step S64), the controller 4 transfers the write data, which has the size corresponding to the minimum write size and is associated with the detected stream, from the write buffer 51 in the host memory to the internal buffer 16 (Step S65). The controller 4 then writes the write data transferred to the internal buffer 16 to the write destination block allocated for this stream (Step S66).

Note that the controller 4 returns responses (completions) indicating completions of these write commands associated with this stream to the host 2 after completion of writing to the write destination block in Step S66.

When the stream in which the size of the write data waiting for being written reaches the minimum write size is not detected (NO in Step S64), the controller 4 detects the presence or absence of a write command after an elapse of a predetermined time from reception (Step S67).

When it is detected that the predetermined time has elapsed from the reception of the write command corresponding to a certain stream (YES in Step S67), the controller 4 transfers the write data associated with this write command from the write buffer 51 in the host memory to the DRAM buffer 32 as write data for this stream (Step S68). After the transfer of the write data associated with the write command from the write buffer 51 in the host memory to the DRAM buffer 32, the controller 4 deletes this write command from the command queue that stores this write command. The controller 4 then returns a response indicating completion of this write command to the host 2.

As described above, when a predetermined time has elapsed from the reception of the write command corresponding to a certain stream, processing for transferring the write data associated with this write command from the write buffer 51 in the host memory to the DRAM buffer 32, and processing for returning the response indicating completion of this write command to the host 2 are executed by the controller 4.

Further, in the configuration in which the write data associated with the write command belonging to the group corresponding to a certain stream is transferred to the DRAM buffer 32, the controller 4 executes data transfer from the write buffer 51 in the host memory to the internal buffer 16 under the condition that the total length (=L1+L2) of the length (L1) of the write data transferred to the DRAM buffer 32 and the length (L2) of the write data waiting for being written associated with the set of the write commands that belong to the group corresponding to this stream reaches the minimum write size.

Figure 23:
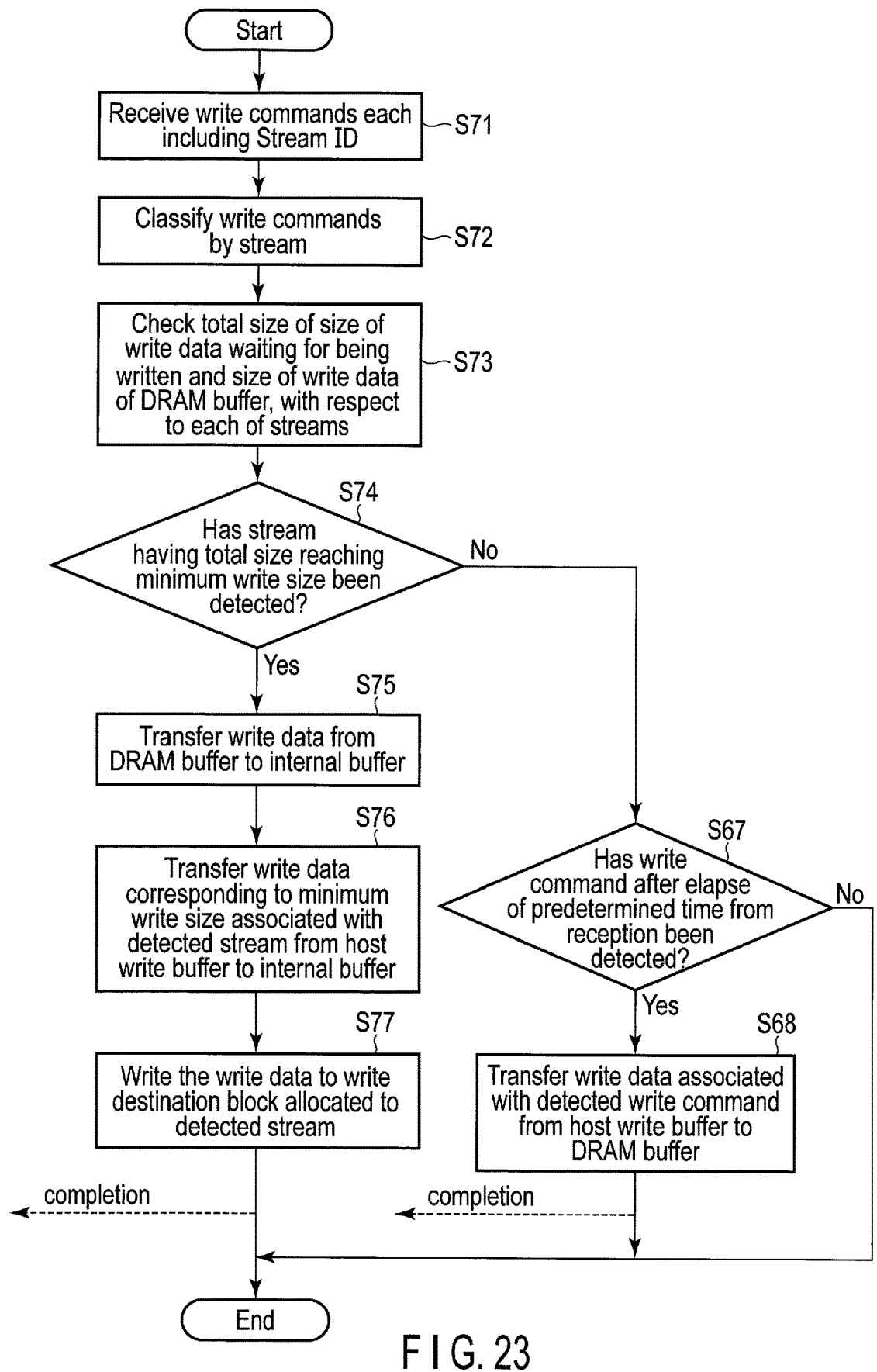
FIG. 23 is a flowchart illustrating another procedure of the writing operation which is executed in the memory system according to the embodiment.

A flowchart in FIG. 23 illustrates a procedure of the writing operation executed in the SSD 3 by using the DRAM buffer 32.

The controller 4 receives write commands each including a stream ID from the host 2 (Step S71). The controller 4 classifies received write commands for each stream (Step S72). In Step S72, the controller 4 classifies received write commands into a plurality of groups corresponding to the streams #1 to #n, by storing each of the received write commands in one of the command queues 41-1 to 41-n. Accordingly, write commands each including the stream ID #1 are accumulated in the command queue 41-1, write commands each including the stream ID #2 are accumulated in the command queue 41-2, and write commands each including the stream ID #n are accumulated in the command queue 41-n.

The controller 4 checks the total size of the size of the write data waiting for being written corresponding to the accumulated write commands and the size of the write data in the DRAM buffer 32 (the total length) for each of the streams, and detects the stream in which the total size of the write data has reached the minimum write size of the NAND flash memory 5 (Step 373). That is, in Step S73, for each of the plurality of groups, the controller 4 determines whether or not the total length of the length of the write data waiting for being written associated with the set of write commands in the command queue and the length of the write data in the DRAM buffer 32 has reached the minimum write size.

When a stream is detected in which the total length of the length of the write data waiting for being written associated with the set of write commands in the command queue and the length of the write data in the DRAM buffer 32 has reached the minimum write size (YES in Step S74), the controller 4 transfers the write data for the detected stream from the DRAM buffer 32 to the internal buffer 16 (Step S75). The controller 4 transfers the write data associated with the detected stream from the write buffer 51 in the host memory to the internal buffer 16 (Step S76). The controller 4 then writes the write data transferred from the write buffer 51 in the host memory to the internal buffer 16 to the write destination block allocated to this stream together with the write data transferred from the DRAM buffer 32 to the internal buffer 16 (Step S77).

Note that the controller 4 returns responses indicating completions of these write commands corresponding to the write data transferred from the write buffer 51 in the host memory to the internal buffer 16 to the host 2 after completion of writing to the write destination block in Step S77. Further, these write commands are deleted from the command queue.

When a stream in which the total length of the length of the write data waiting for being written and the length of the write data in the DRAM buffer 32 has reached the minimum write size is not detected (NO in Step S74), the controller 4 executes processing in Steps S67 and S68 in FIG. 22.

That is, the controller 4 detects the presence or absence of a write command after an elapse of a predetermined time from reception (Step S67). When it is detected that the predetermined time has elapsed from the reception of the write command corresponding to a certain stream (YES in Step S67), the controller 4 transfers the write data associated with this write command from the write buffer 51 in the host memory to the DRAM buffer 32 as write data for this stream (Step S68). After the transfer of the write data associated with the write command from the write buffer 51 in the host memory to the DRAM buffer 32, the controller 4 deletes this write command from the command queue that stores this write command. The controller 4 then returns a response indicating completion of this write command to the host 2.

As described above, according to the present embodiment, when a read command is received from the host, a first counter value corresponding to a read target block having a block address allocated to a logical address of read target data specified by the received read command among plurality of first counter values corresponding to the plurality of blocks is incremented. The read target data is read from the read target block or the buffer depending on whether or not the read target data can be read from the read target block, and the first counter value corresponding to the read target block is decremented after the reading has been finished.

Further, when the read target block is one write destination block among the plurality of write destination blocks and the read target data is not readable from the one write destination block, a second counter value corresponding to the one write destination block among the plurality of second counter values corresponding to the plurality of write destination blocks is incremented, the read target data is read from the buffer, and the second counter value corresponding to the one write destination block is decremented after the reading has been finished.

In this way, when data being written to or waiting for being written to the write destination block is specified as read target data, the read target data is read from the buffer (the first buffer in SSD 3 or the write buffer 51 of host 2). Accordingly, even when data being written to a certain write destination block or data which is not started to be written and is waiting for being written to this write destination block is requested by a read command from host 2, this data can be returned to host 2. Therefore, it is possible to improve the performance related to data reading.

Further, based on the plurality of first counter values, processing for transitioning a state of a block associated with an uncompleted read command to a state reusable as a new write destination block is prohibited. Furthermore, based on the plurality of second counter values, release of a region in the buffer that stores data being written or data waiting for being written to a write destination block associated with an uncompleted read command that requires reading of data from the buffer is prohibited. Therefore, in the present embodiment, it is possible to prevent an occurrence of a situation in which the data cannot be correctly read from the block or the buffer determined as the data reading source, so that consistency of the data can be maintained in both cases where data is read from the block and from the buffer.

Note that in the case where the SSD 3 has a configuration not including the DRAM 6, when the physical storage location allocated to the logical address of the read target data is an un-readable region in one write destination block among the plurality of write destination blocks, read target data is read from the write buffer 51 of the host 2.

Further, in a case where a relatively large DRAM buffer 32 can be used, the write data may be transferred from the write buffer 51 of the host 2 to the DRAM buffer 32 each time a write command is received from the host 2.

Note that in the present embodiment, a NAND flash memory is exemplified as the nonvolatile memory. However, the functions of the present embodiment can be applied to various nonvolatile memories such as MRAM (Magnetoresistive Random Access Memory), PRAM (Phase change Random Access Memory), ReRAM (Resistive Random Access Memory), or FeRAM (Ferroelectric Random Access Memory).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
   a nonvolatile memory including a plurality of blocks each including a plurality of pages; and
   a controller configured to write data to a plurality of write destination blocks allocated from the plurality of blocks, wherein
   the controller is configured to:
      in response to receiving a read command from the host, increment a first counter value corresponding to a first block having a block address allocated to a logical address of read target data specified by the received read command, wherein the first counter value is among a plurality of first counter values corresponding to the plurality of blocks;
      read the read target data from a buffer when the read target data is waiting for being written or is being written to the first block, and decrement the first counter value corresponding to the first block after the reading from the buffer has been finished, the buffer being a first buffer in the memory system or a write buffer of the host; and
      when there is no valid data left in one block among the plurality of blocks, transition a state of the one block to a state reusable as a new write destination block after a first counter value corresponding to the one block among the plurality of first counter values becomes zero.

2. The memory system according to claim 1, wherein the controller is configured to read the read target data from the first block when the read target data is readable from the first block, and decrement the first counter value corresponding to the first block after the reading from the first block has been finished.

3. The memory system according to claim 1, wherein the controller is configured to:
   when determining the first block is a first write destination block among the plurality of write destination blocks and the read target data is waiting for being written or is being written to the first write destination block, increment a second counter value corresponding to the first write destination block among a plurality of second counter values corresponding to the plurality of write destination blocks, read the read target data from the buffer, and decrement the second counter value corresponding to the first write destination block after the reading from the buffer has been finished; and
   prohibit release of a first region in the buffer, on the basis of the plurality of second counter values, the first region being a region that stores data being written or waiting to be written to a write destination block associated with an uncompleted read command that requires reading of data from the buffer.

4. The memory system according to claim 3, wherein when a first write data of the buffer becomes unnecessary due to a progress of a writing operation to one write destination block among the plurality of write destination blocks, the controller is configured to permit release of a region in the buffer that stores the first write data after a second counter value corresponding to the one write destination block among the plurality of second counter values becomes zero.

5. The memory system according to claim 3, wherein the controller is configured to acquire a location in the buffer that stores the read target data by referring to buffer management information indicating correspondence between each physical address of an un-readable region in the first write destination block and each of the locations in the buffer that stores data being written or waiting to be written to the first write destination block, and read the target data from the acquired location in the buffer.

6. The memory system according to claim 3, wherein
   the controller is configured to receive write commands each including a stream identifier indicating one of a plurality of streams from the host, and to write data associated with the streams to the plurality of write destination blocks, respectively,
   the buffer includes a plurality of regions that stores the write data corresponding to the streams,
   the controller is configured to, when a first write data in the buffer is no longer necessary due to a progress of a writing operation to one write destination block among the plurality of write destination blocks, prohibit release of a region that stores write data associated with a stream corresponding to the first write destination block among the regions in the buffer until a second counter value corresponding to the one write destination block among the second counter values becomes zero.

7. The memory system according to claim 1, wherein processing for transitioning includes processing for adding one of the plurality of blocks to a list of free blocks or processing for executing an erasing operation for the one of the plurality of blocks.

8. A method of controlling a nonvolatile memory including a plurality of blocks each including a plurality of pages, the method comprising:
   writing data to a plurality of write destination blocks allocated from the plurality of blocks;
   in response to receiving a read command from a host, incrementing a first counter value corresponding to a first block having a block address allocated to a logical address of read target data specified by the received read command, wherein the first counter value is among a plurality of first counter values corresponding to the plurality of blocks;

reading the read target data from a buffer when the read target data is waiting for being written or is being written to the first block, and decrementing the first counter value corresponding to the first block after the reading from the buffer has been finished, the buffer being a first buffer in the memory system or a write buffer of the host; and when there is no valid data left in one block among the plurality of blocks, transitioning a state of the one block to a state reusable as a new write destination block after a first counter value corresponding to the one block among the plurality of first counter values becomes zero.

9. The method according to claim 8, further comprising:
reading the read target data from the first block when the read target data is readable from the first block, and decrementing the first counter value corresponding to the first block after the reading from the first block has been finished.

10. The method according to claim 8, further comprising:
when determining the first block is a first write destination block among the plurality of write destination blocks and the read target data is waiting for being written or is being written to the first write destination block, incrementing a second counter value corresponding to the first write destination block among a plurality of second counter values corresponding to the plurality of write destination blocks, reading the read target data from the buffer, and decrementing the second counter value corresponding to the first write destination block after the reading from the buffer has been finished; and prohibiting release of a first region in the buffer, on the basis of the plurality of second counter values, the first region being a region that stores data being written or waiting to be written to a write destination block associated with an uncompleted read command that requires reading of data from the buffer.

11. The method according to claim 10, further comprising:
when a first write data of the buffer becomes unnecessary due to a progress of a writing operation to one write destination block among the plurality of write destination blocks, permitting release of a region in the buffer that stores the first write data after a second counter value corresponding to the one write destination block among the plurality of second counter values becomes zero.

12. The method according to claim 10, further comprising:
receiving write commands each including a stream identifier indicating one of a plurality of streams from the host, and writing write data associated with the streams to the plurality of write destination blocks, respectively, wherein the buffer includes a plurality of regions that stores the write data corresponding to the streams; and prohibiting, when a first write data in the buffer is no longer necessary due to a progress of a writing operation to one write destination block among the plurality of write destination blocks, release of a region that stores write data associated with a stream corresponding to the first write destination block among the regions in the buffer until a second counter value corresponding to the one write destination block among the second counter values becomes zero.

13. The method according to claim 8, further comprising:
acquiring a location in the buffer that stores the read target data by referring to buffer management information indicating correspondence between each physical address of an un-readable region in the first write destination block and each of the locations in the buffer that stores data being written or waiting to be written to the first write destination block, and reading the target data from the acquired location in the buffer.

14. The method according to claim 8, wherein the transitioning includes adding one of the plurality of blocks to a list of free blocks or executing an erasing operation for the one of the plurality of blocks.

* * * * *